US012757892B2

(12) United States Patent
Anderson et al.

(10) Patent No.: US 12,757,892 B2
(45) Date of Patent: Oct. 13, 2026

(54) SYSTEM FOR HYPOTHERMIC TRANSPORT

(71) Applicant: Paragonix Technologies, Inc., North Waltham, MA (US)

(72) Inventors: Lisa Maria Anderson, Cambridge, MA (US); Adam Collette, Medford, MA (US)

(73) Assignee: Paragonix Technologies, Inc., North Waltham, MA (US)

( * ) Notice: Subject to any disclaimer, the term of this patent is extended or adjusted under 35 U.S.C. 154(b) by 0 days.

(21) Appl. No.: 18/939,389

(22) Filed: Nov. 6, 2024

(65) Prior Publication Data

US 2025/0072415 A1 Mar. 6, 2025

Related U.S. Application Data

(63) Continuation of application No. PCT/US2023/021241, filed on May 5, 2023.

(60) Provisional application No. 63/339,091, filed on May 6, 2022, provisional application No. 63/339,087, filed on May 6, 2022.

(51) Int. Cl.

| | |
|---|---|
| ***A01N 1/143*** | (2025.01) |
| ***A01N 1/126*** | (2025.01) |
| ***A01N 1/146*** | (2025.01) |
| ***A01N 1/148*** | (2025.01) |

(52) U.S. Cl.

CPC ............ *A01N 1/143* (2025.01); *A01N 1/126* (2025.01); *A01N 1/146* (2025.01); *A01N 1/148* (2025.01)

(58) Field of Classification Search

CPC ................................ A01N 1/146; A01N 1/143

See application file for complete search history.

(56) References Cited

U.S. PATENT DOCUMENTS

| | | | |
|---|---|---|---|
| 3,323,872 | A | 6/1967 | Scott |
| 3,398,743 | A | 8/1968 | Shalit |

(Continued)

FOREIGN PATENT DOCUMENTS

| | | |
|---|---|---|
| CA | 2980782 | 11/2007 |
| CA | 2722615 | 10/2009 |

(Continued)

OTHER PUBLICATIONS

Naoum (Xometry: Everything You Need to Know About Acrylic and Its Uses, Published May 4, 2022) https://www.xometry.com/resources/materials/acrylic-pmma/#:~: text=Acrylic%20is%20a%20type%20of,worst%20and%20dysfunctional%20at%20best. (Year: 2022).*

(Continued)

*Primary Examiner* — James D Schultz

*Assistant Examiner* — Keenan A Bates

(74) *Attorney, Agent, or Firm* — Knobbe, Martens, Olson & Bear, LLP

(57) ABSTRACT

A system for the hypothermic transport of biological samples, such as tissues, organs, or body fluids. The system includes support systems to permit arrangement of cooling media around a biological sample without potentially damaging direct contact between the cooling media and the biological sample. Systems and methods disclosed herein also include specific configurations, types, and performance characteristics of cooling media such as phase change materials to allow for extended hypothermic storage and transport.

18 Claims, 18 Drawing Sheets

(56) References Cited

U.S. PATENT DOCUMENTS 3,607,646 A 9/1971 de Roissart
3,935,065 A 1/1976 Doerig
4,336,248 A 6/1982 Bonhard et al.
4,502,295 A 3/1985 Toldeo-Pereyra
4,575,498 A 3/1986 Holmes et al.
4,643,713 A 2/1987 Viitala
4,723,974 A 2/1988 Ammerman
4,931,333 A 6/1990 Henry
4,952,409 A 8/1990 Bando et al.
4,976,708 A 12/1990 Oshiyama
5,051,352 A 9/1991 Martindale et al.
5,066,578 A 11/1991 Wikman-Coffelt
5,093,969 A 3/1992 McGuire
5,133,470 A 7/1992 Abrams et al.
5,141,847 A 8/1992 Sugimachi et al.
5,149,321 A 9/1992 Klatz et al.
5,157,930 A 10/1992 McGhee et al.
5,186,431 A 2/1993 Tamari
5,234,405 A 8/1993 Klatz et al.
RE34,387 E 9/1993 Holmes et al.
5,252,537 A 10/1993 De Winter-Scailteur
5,285,657 A 2/1994 Bacchi et al.
5,306,711 A 4/1994 Andrews
D347,894 S 6/1994 Hansen et al.
5,320,846 A 6/1994 Bistrian et al.
5,326,706 A 7/1994 Yland et al.
5,356,771 A 10/1994 O'Dell
5,362,622 A 11/1994 O'Dell et al.
5,385,821 A 1/1995 O'Dell et al.
5,395,314 A 3/1995 Klatz et al.
5,434,045 A 7/1995 Jost
5,435,142 A 7/1995 Silber
5,570,588 A 11/1996 Lowe
5,584,804 A 12/1996 Klatz et al.
5,586,438 A * 12/1996 Fahy ...................... A01N 1/143
435/284.1
5,599,659 A 2/1997 Brasile et al.
5,601,972 A 2/1997 Meryman
5,629,145 A 5/1997 Meryman
5,643,712 A 7/1997 Brasile
5,656,154 A 8/1997 Meryman
5,696,152 A 12/1997 Southard
5,699,793 A 12/1997 Brasile
5,702,881 A 12/1997 Brasile et al.
5,707,971 A 1/1998 Fahy
5,709,654 A 1/1998 Klatz et al.
5,712,084 A 1/1998 Osgood
5,716,378 A 2/1998 Minten
5,752,929 A 5/1998 Klatz et al.
5,827,222 A 10/1998 Klatz et al.
5,843,024 A 12/1998 Brasile
5,916,800 A 6/1999 Elizondo et al.
5,922,598 A 7/1999 Mintchev
5,963,335 A 10/1999 Boutelle
5,965,433 A 10/1999 Gardetto et al.
6,014,864 A 1/2000 Owen
6,020,575 A 2/2000 Nagle et al.
6,024,698 A 2/2000 Brasile
6,042,559 A * 3/2000 Dobak, III ............ A61M 1/369
604/113
6,046,046 A 4/2000 Hassanein
6,060,232 A 5/2000 Von Baeyer et al.
6,100,082 A 8/2000 Hassanein
6,174,719 B1 1/2001 Elizondo et al.
6,194,137 B1 2/2001 Khirabadi et al.
6,209,343 B1 4/2001 Owen
6,241,945 B1 6/2001 Owen
6,260,360 B1 7/2001 Wheeler
6,280,925 B1 8/2001 Brockbank
6,303,388 B1 10/2001 Fahy
D453,828 S 2/2002 Brassil et al.
6,375,613 B1 4/2002 Brasile
6,381,981 B1 5/2002 Yaddgo et al.
6,406,839 B1 6/2002 Segall et al.
6,413,713 B1 7/2002 Serebrennikov
6,475,716 B1 11/2002 Seki
6,485,450 B1 11/2002 Owen
6,492,103 B1 12/2002 Taylor
D468,436 S 1/2003 Brassil et al.
D470,594 S 2/2003 Brassil et al.
6,569,615 B1 5/2003 Thatte et al.
6,582,953 B2 6/2003 Brasile
6,596,531 B2 7/2003 Campbell et al.
6,642,019 B1 11/2003 Anderson et al.
6,642,045 B1 11/2003 Brasile
6,656,380 B2 12/2003 Wood et al.
6,673,008 B1 1/2004 Thompson et al.
6,673,594 B1 1/2004 Owen et al.
6,677,150 B2 1/2004 Alford et al.
6,699,231 B1 3/2004 Sterman et al.
6,736,836 B2 5/2004 Montgomery
6,740,484 B1 5/2004 Khirabadi et al.
6,773,877 B2 8/2004 Fahy
6,794,124 B2 9/2004 Steen
6,794,182 B2 9/2004 Wolf, Jr.
6,905,871 B1 6/2005 Doorschodt et al.
6,924,267 B2 8/2005 Daemen et al.
6,948,334 B1 9/2005 Challenger
6,953,655 B1 10/2005 Hassanein et al.
6,977,140 B1 12/2005 Owen et al.
6,994,954 B2 2/2006 Taylor
6,997,688 B1 2/2006 Klein et al.
7,005,253 B2 2/2006 Polyak et al.
7,008,535 B1 3/2006 Spears et al.
7,029,839 B2 4/2006 Toledo-Pereyra et al.
D527,225 S 8/2006 Krieger et al.
D531,319 S 10/2006 Schein et al.
D531,320 S 10/2006 Garland et al.
7,157,222 B2 1/2007 Khirabadi et al.
7,176,015 B2 2/2007 Alford et al.
7,240,513 B1 7/2007 Conforti
7,270,946 B2 9/2007 Brockbank et al.
7,294,278 B2 11/2007 Spears et al.
7,316,922 B2 1/2008 Streeter
7,326,564 B2 2/2008 Lundell et al.
7,361,365 B2 4/2008 Birkett et al.
7,410,474 B1 8/2008 Friend et al.
D576,488 S 9/2008 Miota et al.
7,504,201 B2 3/2009 Taylor et al.
7,572,622 B2 8/2009 Hassanein et al.
7,651,835 B2 1/2010 Hassanein et al.
7,678,563 B2 3/2010 Wright et al.
7,691,622 B2 4/2010 Garland et al.
7,749,693 B2 7/2010 Brassil et al.
7,811,808 B2 10/2010 van der Plaats et al.
7,824,848 B2 11/2010 Owen et al.
D630,318 S 1/2011 Goodwin
7,897,327 B2 3/2011 Millis et al.
8,097,449 B2 1/2012 Garland et al.
8,152,367 B2 * 4/2012 Roberts .................... G01K 1/14
220/523
D664,261 S 7/2012 Kravitz et al.
8,268,547 B2 9/2012 Owen et al.
8,268,612 B2 9/2012 Owen et al.
8,304,181 B2 11/2012 Hassanein et al.
D672,466 S 12/2012 Kravitz et al.
8,323,954 B2 12/2012 Kravitz et al.
8,361,091 B2 1/2013 Schein et al.
8,420,380 B2 4/2013 Fishman et al.
8,465,970 B2 6/2013 Hassanein et al.
D692,159 S 10/2013 Judson et al.
D692,160 S 10/2013 Judson et al.
8,613,202 B2 12/2013 Williams
D697,224 S 1/2014 Judson et al.
8,685,709 B2 4/2014 Bunegin et al.
8,785,116 B2 7/2014 Anderson et al.
8,802,425 B2 8/2014 Ferrera
D713,972 S 9/2014 Judson et al.
D714,461 S 9/2014 Judson et al.
D714,462 S 9/2014 Judson et al.
8,828,034 B2 9/2014 Kravitz et al.
8,828,710 B2 9/2014 Anderson et al.
8,835,158 B2 9/2014 Judson et al.
D727,492 S 4/2015 Scampoli

(56) References Cited

U.S. PATENT DOCUMENTS

D734,868 S 7/2015 Gilboa
9,089,126 B2 7/2015 Faulkner et al.
9,155,297 B2 10/2015 Anderson et al.
9,247,728 B2 2/2016 Fishman et al.
9,253,976 B2 2/2016 Anderson et al.
9,259,562 B2 2/2016 Steinman et al.
9,357,767 B2 6/2016 Steinman et al.
9,426,979 B2 8/2016 Anderson et al.
D765,874 S 9/2016 Judson et al.
9,560,846 B2 2/2017 Anderson et al.
D787,696 S 5/2017 Schmieta et al.
D791,939 S 7/2017 Turturro et al.
9,867,368 B2 1/2018 Anderson et al.
9,910,000 B2 * 3/2018 Lynam .................. G01N 25/66
9,936,689 B2 4/2018 Anderson et al.
D819,223 S 5/2018 Judson et al.
10,076,112 B2 9/2018 Hassanein et al.
10,085,441 B2 10/2018 Steinman et al.
D861,161 S 9/2019 Schuessler
D882,077 S 4/2020 Schmitt
D884,887 S 5/2020 Kangastupa
D901,680 S 11/2020 Guala
10,918,102 B2 2/2021 Uygun et al.
D912,245 S 3/2021 Grudo et al.
11,089,775 B2 8/2021 Anderson et al.
11,166,452 B2 11/2021 Judson et al.
11,178,866 B2 11/2021 Anderson et al.
D963,194 S 9/2022 Bixon et al.
11,472,625 B2 10/2022 Mirzaee Kakhki
11,528,903 B1 12/2022 He et al.
D975,273 S 1/2023 Theriot
11,576,371 B2 2/2023 Legallais et al.
11,632,951 B2 4/2023 Collette et al.
11,659,834 B2 5/2023 Judson et al.
D999,370 S 9/2023 Wade et al.
D1,002,868 S 10/2023 Bixon et al.
D1,003,434 S 10/2023 Fangrow
11,785,938 B2 10/2023 Clavien et al.
D1,016,251 S 2/2024 Castriotta et al.
D1,031,028 S 6/2024 Bornhoft et al.
12,035,708 B2 7/2024 Anderson et al.
12,052,985 B2 8/2024 Anderson et al.
12,070,029 B2 8/2024 Collette et al.
12,096,765 B1 9/2024 Anderson et al.
12,121,023 B1 10/2024 Anderson et al.
12,161,110 B2 12/2024 Collette et al.
12,178,206 B2 12/2024 Collette et al.
12,245,585 B2 3/2025 Judson et al.
12,245,586 B2 3/2025 Anderson et al.
12,279,610 B2 4/2025 Anderson et al.
12,310,357 B2 5/2025 Collette et al.
12,342,810 B2 7/2025 Anderson et al.
12,357,533 B2 7/2025 Bulka et al.
12,369,576 B2 7/2025 Anderson et al.
D1,087,382 S 8/2025 Macari et al.
12,410,408 B2 9/2025 Macari et al.
12,485,064 B2 12/2025 Bulka et al.
12,543,729 B2 2/2026 Anderson et al.
12,557,806 B2 2/2026 Anderson et al.
12,564,187 B2 3/2026 Judson et al.
2001/0025191 A1 9/2001 Montgomery
2002/0042131 A1 4/2002 Brockbank et al.
2002/0051779 A1 5/2002 Gage et al.
2002/0064768 A1 5/2002 Polyak et al.
2002/0068360 A1 6/2002 Brockbank et al.
2002/0115634 A1 8/2002 Polyak et al.
2002/0138013 A1 9/2002 Guerrero et al.
2002/0177117 A1 11/2002 Wolf
2003/0022148 A1 1/2003 Seki
2003/0053998 A1 3/2003 Daemen et al.
2003/0054540 A1 3/2003 Alford et al.
2003/0080126 A1 5/2003 Voute et al.
2003/0118980 A1 6/2003 Taylor
2003/0125804 A1 7/2003 Kruse et al.
2003/0180704 A1 9/2003 Brockbank et al.
2004/0014199 A1 1/2004 Streeter
2004/0038192 A1 2/2004 Brasile
2004/0038193 A1 2/2004 Brasile
2004/0045314 A1 3/2004 Roth et al.
2004/0058432 A1 3/2004 Owen et al.
2004/0067480 A1 4/2004 Brockbank et al.
2004/0111104 A1 6/2004 Schein et al.
2004/0170950 A1 9/2004 Prien
2004/0171138 A1 9/2004 Hassanein et al.
2004/0221719 A1 11/2004 Wright et al.
2004/0224298 A1 11/2004 Brassil et al.
2004/0224299 A1 11/2004 Garland et al.
2004/0241634 A1 12/2004 Millis et al.
2004/0248281 A1 12/2004 Wright et al.
2005/0100876 A1 5/2005 Khirabadi et al.
2005/0147958 A1 7/2005 Hassanein et al.
2005/0153271 A1 7/2005 Wenrich
2005/0221269 A1 10/2005 Taylor et al.
2005/0233299 A1 10/2005 Sawa et al.
2005/0255442 A1 11/2005 Brassil et al.
2005/0277106 A1 12/2005 Daemen et al.
2006/0019388 A1 1/2006 Hutmacher et al.
2006/0063142 A1 3/2006 Owen et al.
2006/0121439 A1 6/2006 Baker
2006/0121512 A1 6/2006 Parenteau
2006/0121605 A1 6/2006 Parenteau
2006/0141077 A1 6/2006 Pettersson
2006/0148062 A1 7/2006 Hassanein et al.
2006/0154357 A1 7/2006 Hassanein et al.
2006/0154358 A1 7/2006 Hassanein et al.
2006/0154359 A1 7/2006 Hassanein et al.
2006/0160204 A1 7/2006 Hassanein et al.
2006/0168985 A1 8/2006 Gano
2006/0233986 A1 10/2006 Gutsche et al.
2006/0292544 A1 12/2006 Hassanein et al.
2007/0009881 A1 1/2007 Arzt et al.
2007/0015131 A1 1/2007 Arzt et al.
2007/0028642 A1 2/2007 Glade et al.
2007/0166292 A1 7/2007 Brasile
2007/0184545 A1 8/2007 Plaats et al.
2007/0190636 A1 8/2007 Hassanein et al.
2007/0193297 A1 8/2007 Wilson
2007/0243518 A1 10/2007 Sema et al.
2007/0264485 A1 11/2007 Stepanian et al.
2007/0275364 A1 11/2007 Hassanein et al.
2008/0017194 A1 1/2008 Hassanein et al.
2008/0070229 A1 3/2008 Streeter
2008/0070302 A1 3/2008 Brockbank et al.
2008/0096184 A1 4/2008 Brasile
2008/0145919 A1 6/2008 Franklin et al.
2008/0187901 A1 8/2008 Doorschodt et al.
2008/0234768 A1 9/2008 Hassanein et al.
2008/0286747 A1 11/2008 Curtis et al.
2008/0288399 A1 11/2008 Curtis et al.
2008/0311552 A1 12/2008 Min
2009/0078699 A1 3/2009 Mustafa et al.
2009/0197240 A1 8/2009 Fishman et al.
2009/0197241 A1 8/2009 Fishman et al.
2009/0197292 A1 8/2009 Fishman et al.
2009/0197324 A1 8/2009 Fishman et al.
2009/0197325 A1 8/2009 Fishman et al.
2009/0199904 A1 8/2009 Babbitt et al.
2009/0226878 A1 9/2009 Taylor et al.
2009/0240277 A1 9/2009 Connors et al.
2009/0291486 A1 11/2009 Wenrich
2010/0015592 A1 1/2010 Doorschodt
2010/0028850 A1 2/2010 Brassil
2010/0056966 A1 3/2010 Toth
2010/0086907 A1 4/2010 Bunegin et al.
2010/0112542 A1 5/2010 Wright et al.
2010/0129784 A1 5/2010 Eichentopf et al.
2010/0151559 A1 6/2010 Garland et al.
2010/0171802 A1 7/2010 Lee et al.
2010/0175393 A1 7/2010 Burke et al.
2010/0209902 A1 8/2010 Zal et al.
2010/0216110 A1 8/2010 Brockbank
2010/0221696 A1 9/2010 Owen et al.
2010/0233670 A1 9/2010 Gavish
2010/0234928 A1 9/2010 Rakhorst et al.

(56) References Cited

U.S. PATENT DOCUMENTS

| | | | |
|---|---|---|---|
| 2011/0033916 | A1 | 2/2011 | Hutzenlaub et al. |
| 2011/0039253 | A1 | 2/2011 | Owen et al. |
| 2011/0053256 | A1 | 3/2011 | Owen et al. |
| 2011/0059429 | A1 | 3/2011 | Owen et al. |
| 2011/0065169 | A1 | 3/2011 | Steen et al. |
| 2011/0129810 | A1 | 6/2011 | Owen et al. |
| 2011/0129908 | A1 | 6/2011 | Owen et al. |
| 2011/0136096 | A1 | 6/2011 | Hassanein et al. |
| 2011/0173023 | A1 | 7/2011 | LeClair et al. |
| 2011/0177487 | A1 | 7/2011 | Simsir et al. |
| 2011/0183310 | A1 | 7/2011 | Kravitz et al. |
| 2011/0212431 | A1 | 9/2011 | Bunegin et al. |
| 2011/0217689 | A1 | 9/2011 | Bunegin et al. |
| 2012/0042976 | A1 | 2/2012 | Toledo |
| 2012/0116152 | A1 | 5/2012 | Faulkner et al. |
| 2012/0148542 | A1 | 6/2012 | Kravitz |
| 2012/0264104 | A1 | 10/2012 | Ferrera |
| 2012/0266564 | A1 | 10/2012 | Haarmann et al. |
| 2012/0301952 | A1 | 11/2012 | Anderson et al. |
| 2012/0309078 | A1 | 12/2012 | Anderson et al. |
| 2013/0177897 | A1 | 7/2013 | Kravitz et al. |
| 2014/0041403 | A1 | 2/2014 | Anderson et al. |
| 2014/0087357 | A1 | 3/2014 | Kohl et al. |
| 2014/0140815 | A1 | 5/2014 | Shener-Irmakoglu et al. |
| 2014/0157797 | A1* | 6/2014 | Kovalick .................. F25D 3/06 62/371 |
| 2014/0314881 | A1 | 10/2014 | Reynolds et al. |
| 2014/0349273 | A1 | 11/2014 | Anderson et al. |
| 2014/0356850 | A1 | 12/2014 | Anderson et al. |
| 2014/0356933 | A1 | 12/2014 | Anderson et al. |
| 2014/0377880 | A1 | 12/2014 | Emburgh et al. |
| 2015/0017627 | A1 | 1/2015 | Anderson et al. |
| 2015/0204598 | A1 | 7/2015 | Affleck et al. |
| 2015/0209017 | A1 | 7/2015 | Fleming et al. |
| 2015/0230453 | A1 | 8/2015 | Fontes et al. |
| 2015/0373967 | A1 | 12/2015 | Anderson et al. |
| 2016/0074234 | A1 | 3/2016 | Abichandani et al. |
| 2016/0095310 | A1 | 4/2016 | Anderson et al. |
| 2016/0183517 | A1 | 6/2016 | Potenziano |
| 2016/0271015 | A1 | 9/2016 | Wengreen et al. |
| 2016/0347532 | A1* | 12/2016 | McCormick .............. F25D 3/08 |
| 2016/0355318 | A1 | 12/2016 | Epentos et al. |
| 2016/0362240 | A1* | 12/2016 | Ferracamo, Jr. ........ A61J 1/165 |
| 2016/0374332 | A1 | 12/2016 | Hassanein et al. |
| 2017/0058257 | A1 | 3/2017 | Levner et al. |
| 2017/0113181 | A1 | 4/2017 | Sinstedten et al. |
| 2017/0318803 | A1 | 11/2017 | Gil et al. |
| 2018/0000068 | A1 | 1/2018 | Peralta |
| 2018/0132478 | A1 | 5/2018 | Anderson et al. |
| 2018/0352807 | A1* | 12/2018 | Judson ................. A01N 1/0247 |
| 2019/0038388 | A1 | 2/2019 | Schmitt et al. |
| 2019/0175394 | A1 | 6/2019 | Kim |
| 2019/0320649 | A1 | 10/2019 | Bunegin |
| 2019/0374693 | A1 | 12/2019 | Kheradvar et al. |
| 2020/0002075 | A1 | 1/2020 | Lee et al. |
| 2020/0187490 | A1 | 6/2020 | Kravitz et al. |
| 2020/0253195 | A1 | 8/2020 | Bagnato et al. |
| 2020/0278339 | A1 | 9/2020 | Wang et al. |
| 2020/0375178 | A1 | 12/2020 | Becker et al. |
| 2021/0235691 | A1 | 8/2021 | Collette et al. |
| 2021/0400952 | A1 | 12/2021 | Judson et al. |
| 2021/0400953 | A1 | 12/2021 | Anderson et al. |
| 2022/0007368 | A1 | 1/2022 | Tang et al. |
| 2022/0007638 | A1 | 1/2022 | Judson et al. |
| 2022/0039373 | A1 | 2/2022 | Hassanein et al. |
| 2022/0256838 | A1 | 8/2022 | Anderson et al. |
| 2022/0322658 | A1 | 10/2022 | Keshavjee et al. |
| 2023/0059208 | A1 | 2/2023 | Shelton et al. |
| 2023/0073834 | A1 | 3/2023 | Luke |
| 2023/0089628 | A1 | 3/2023 | Freed |
| 2023/0092486 | A1 | 3/2023 | Pettinato et al. |
| 2023/0284613 | A1 | 9/2023 | Filgate et al. |
| 2023/0284614 | A1 | 9/2023 | Anderson et al. |
| 2023/0337659 | A1 | 10/2023 | Judson et al. |
| 2024/0389576 | A1 | 11/2024 | Anderson et al. |
| 2024/0389577 | A1 | 11/2024 | Anderson et al. |
| 2024/0415110 | A1 | 12/2024 | Anderson et al. |
| 2025/0064674 | A1 | 2/2025 | Bulka et al. |
| 2025/0072416 | A1 | 3/2025 | Anderson et al. |
| 2025/0089704 | A1 | 3/2025 | Collette et al. |
| 2025/0198984 | A1 | 6/2025 | Patel |
| 2025/0204518 | A1 | 6/2025 | Patel |
| 2025/0204519 | A1 | 6/2025 | Bornhoft et al. |
| 2025/0248390 | A1 | 8/2025 | Macari et al. |
| 2025/0311717 | A1 | 10/2025 | Churchill et al. |
| 2025/0311718 | A1 | 10/2025 | Churchill et al. |
| 2025/0311719 | A1 | 10/2025 | Churchill et al. |
| 2025/0318519 | A1 | 10/2025 | Judson et al. |
| 2025/0339335 | A1 | 11/2025 | Bulka et al. |
| 2025/0344692 | A1 | 11/2025 | Collette et al. |
| 2025/0351817 | A1 | 11/2025 | Judson et al. |
| 2025/0374918 | A1 | 12/2025 | Tajima et al. |
| 2025/0388872 | A1 | 12/2025 | Macari et al. |

FOREIGN PATENT DOCUMENTS

| | | |
|---|---|---|
| CA | 2775327 | 3/2011 |
| CA | 3149024 | 3/2021 |
| CH | 551741 | 7/1974 |
| CN | 100402103 C | 7/2008 |
| CN | 101322861 | 12/2008 |
| CN | 104619169 | 5/2015 |
| CN | 105660603 | 6/2016 |
| CN | 205337358 | 6/2016 |
| CN | 107183005 | 9/2017 |
| CN | 112806351 | 5/2021 |
| CN | 308966732 | 11/2024 |
| DE | 19922310 | 11/2000 |
| DE | 10-2005-048625 | 4/2007 |
| EP | 0376763 | 7/1990 |
| EP | 1017274 | 11/2003 |
| EP | 2278874 | 2/2011 |
| EP | 2480069 | 8/2012 |
| EP | 4344544 | 4/2024 |
| FR | 2830077 | 4/2004 |
| JP | H08-169801 | 7/1996 |
| JP | 2000-279519 | 10/2000 |
| JP | 3775098 | 5/2006 |
| JP | 2008-120713 | 5/2008 |
| KR | 10-1499735 | 3/2015 |
| WO | WO 1991/03934 | 4/1991 |
| WO | WO 1994/09274 | 4/1994 |
| WO | WO 1995/12973 | 5/1995 |
| WO | WO 1996/30111 | 10/1996 |
| WO | WO 1997/43899 | 11/1997 |
| WO | WO 1999/15011 | 4/1999 |
| WO | WO 2000/18225 | 4/2000 |
| WO | WO 2000/18226 | 4/2000 |
| WO | WO 2000/60935 | 10/2000 |
| WO | WO 2001/03505 | 1/2001 |
| WO | WO 2001/37719 | 5/2001 |
| WO | WO 2001/54495 | 8/2001 |
| WO | WO 2001/78504 | 10/2001 |
| WO | WO 2001/78505 | 10/2001 |
| WO | WO 2001/95717 | 12/2001 |
| WO | WO 2002/17714 | 3/2002 |
| WO | WO 2002/26034 | 4/2002 |
| WO | WO 2002/32225 | 4/2002 |
| WO | WO 2002/089571 | 11/2002 |
| WO | WO 2004/017838 | 3/2004 |
| WO | WO 2004/026031 | 4/2004 |
| WO | WO 2004/052101 | 6/2004 |
| WO | WO 2004/089085 | 10/2004 |
| WO | WO 2004/089090 | 10/2004 |
| WO | WO 2004/105484 | 12/2004 |
| WO | WO 2004/110146 | 12/2004 |
| WO | WO 2005/022994 | 3/2005 |
| WO | WO 2005/074681 | 8/2005 |
| WO | WO 2005/099588 | 10/2005 |
| WO | WO 2006/033674 | 3/2006 |
| WO | WO 2006/042138 | 4/2006 |
| WO | WO 2006/052133 | 5/2006 |
| WO | WO 2006/060709 | 6/2006 |
| WO | WO 2006/101393 | 9/2006 |

(56) References Cited

FOREIGN PATENT DOCUMENTS

| | | | |
|---|---|---|---|
| WO | WO 2007/025215 | 3/2007 | |
| WO | WO 2007/111495 | 10/2007 | |
| WO | WO 2007/124044 | 11/2007 | |
| WO | WO 2008/108996 | 9/2008 | |
| WO | WO 2008/144021 | 11/2008 | |
| WO | WO 2008/150587 | 12/2008 | |
| WO | WO 2009/020412 | 2/2009 | |
| WO | WO 2009/041806 | 4/2009 | |
| WO | WO 2009/099939 | 8/2009 | |
| WO | WO 2009/132018 | 10/2009 | |
| WO | WO 2010/084424 | 7/2010 | |
| WO | WO 2010/096821 | 8/2010 | |
| WO | WO 2011/038251 | 3/2011 | |
| WO | WO 2012/125782 | 9/2012 | |
| WO | WO 2013/068752 | 5/2013 | |
| WO | WO 2014/026119 | 2/2014 | |
| WO | WO 2014/026128 | 2/2014 | |
| WO | WO 2015/021513 | 2/2015 | |
| WO | WO 2015/126853 | 8/2015 | |
| WO | WO 2017/205967 | 12/2017 | |
| WO | WO 2017/205987 | 12/2017 | |
| WO | WO 2018/015548 | 1/2018 | |
| WO | WO 2018/112072 | 6/2018 | |
| WO | WO 2018/184100 | 10/2018 | |
| WO | WO 2018/226993 | 12/2018 | |
| WO | WO-2020061202 A1 * | 3/2020 | ............ A61B 18/02 |
| WO | WO 2020/252148 | 12/2020 | |
| WO | WO 2021/041181 | 3/2021 | |
| WO | WO 2021/155147 | 8/2021 | |
| WO | WO 2023/154793 | 8/2023 | |
| WO | WO 2025/049335 | 3/2025 | |
| WO | WO 2025/166189 | 7/2025 | |
| WO | WO 2025/217060 | 10/2025 | |
| WO | WO 2025/255395 | 12/2025 | |

OTHER PUBLICATIONS

Briceno et al., "Back-table surgery pancreas allograft for transplantation: Implications in complications", World Journal of Transplantation, vol. 11(1):1-6 (2021).
Brochure describing Paragonix LUNGguard in 12 pages, © 2021, describing the Paragonix Technologies' LUNGguard® Donor Lung Preservation System version 1.0 that was in public use, on sale, or otherwise available to the public before May 6, 2021.
Brown, "Chemical measurements of inulin concentrations in peritoneal dialysis solution", Clin. Chim. vol. 76:103-112 (1977).
Bunegin et al., Interstitial pO2 and high energy phosphates in the canine heart during hypothermic preservation in a new, portable, pulsatile perfusion device, from the Department of Anesthesiology University of Texas Health Science Center at San Antonio, Texas; and Center for Cardiovascular Surgery of the Republic of Lithuania, Vilnius, Lithuania, vol. 3(3):1-6 (1998).
Bunegin et al., The Application of Fluidics Technology for perfusion of adult, human sized, canine hearts, from the Department of Anesthesiology, Health Science Center at San Antonio, University of Texas, vol. 8(1/2):73-78 (2003).
Bunegin et al., "The Application of Fluidics Technology for Organ Preservation", Biomedical Instrumentation & Technology, Mar./Apr. 2004, pp. 155-164.
Calhoon et al., "Twelve-Hour Canine Heart Preservation With a Simple, Portable Hypothermic Organ Perfusion Device", r\nn Thorac Surg 1996:62:91-93.
Ceulemans et al., "Combined liver and lung transplantation", American Journal of Transplantation, vol. 14(10):2412-2416 (2014).
Cypel et al., "Extracorporeal lung perfusion", Current Opinion in Organ Transplantation, vol. 21(3):329-335 (2016).
De Perrot, "Lung preservation, Seminars in Thoracic and Cardiovascular Surgery", Saunders, Philadelphia, PA vol. 16(4):300-308 (2004).
FDA clears Paragonix Technologies' LUNGguard for donor lung preservation, published on Feb. 10, 2020, accessed on Dec. 12, 2024, at https://www.businesswire.com/news/home/20200210005279/en/, accessed on Dec. 12, 2024, in 3 pages.
Galasso, "Inactivating hepatits C virus in donor lungs using light therapies during normothermic ex vivo lung perfusion", Nature Communications, vol. 10(481):1-12 (2019).
Interview with CEO of Paragonix, posted at tactical-medicine.com, posting date Jul. 12, 2022, retrieved Nov. 14, 2023, online, https://tactical-medicine.com/blogs/news/improving-transplant-survival-with-organ-preservation-tech-interview-with-dr-anderson-ceo-of-paragonix (Year: 2022).
Irish Medicines Board "Viaspan" Summary of Product Characteristics available online at <https://www.hpra.ie/img/ _ ./ JcenseSPC_PA0002-075-001_21112012111041.pdf>, Nov. 21, 2012 (6 Pages).
Organ Recovery Systems, Inc., LifePort Brochure, www.organ-recovery.com retrieved Aug. 29, 2012 (12 pages).
"Paragonix announces first-in-man use of LUNGguard™ donor lung preservation system by Duke Hospital", published Feb. 22, 2021, accessed on Dec. 12, 2024, at: https://www.paragonixtechnologies.com/news/paragonix-announces-first-in-man-use-of-lungguard-tm-donor-lung-preservation-system-by-duke-hospital, in 3 pages.
Raredon et al., "Biomimetic culture reactor for whole lung engineering", BioResearch, vol. 5.1:72-83 (2016).
Steinbrook, The New England Journal of Medicine, "Organ Donation after Cardiac Death", Jul. 9, 2007 (5 pages).
T'Hart, "New solutions in organ preservation", Transplantation Reviews, vol. 16:131-141 (2006).
Tolstykh et al., "Novel portable hypothermic pulsatile perfusion preservation technology: Improved viability and function of rodent and canine kidneys", Ann Transplant, 2010; 15(3):1-9.
Tolstykh et al., "Perfusion preservation of rodent kidneys in a portable preservation device based on fuidics technology", Transplantation, vol. 73(9):1508-1526 (2002).
Vries et al., "Systms engineering the organ preservation process for transplantation", Current Opinion in Biotechnology, vol. 58:192-201 (2019).
Wandall et al., "Galactosylation does not prevent the rapid clearance of long-term 40C-stored platelets", Blood, vol. 11(6):3249-3256 (2008).
Weegman et al., "Continuous Real-time Viability Assessment of Kidneys Based on Oxygen Consumption", Transplant Proc. 2010; 42(6):2020-2023.
International Search Report and Written Opinion in application No. PCT/US2023/21241, mailed on Sep. 21, 2023, in 17 pages.
Boteon et al., "Combined hypothermic and normothermic machine perfusion improves functional recovery of extended criteria donor livers", Liver Transplantation, vol. 24(12):1699-1715 (2018).
Chi et al., "The Development of a portable ECG monitor based on DSP", Physics Procedia, vol. 33:765-774 (2012).
Kidney Transport, retrieved online on Feb. 27, 2025, at: https://fluctus.nl/en/portfolio/kidney-assist/, publication date unknown.
Ma et al., "Application and research progress of phase change materials in biomedical field", Biomater. Sci. vol. 9:5762-5780 (2021).
Michel et al., "Innovative cold storage of donor organs using the Paragonix Sherpa Pak™ devices", Heart Lung and Vessels, vol. 7(3):246-255 (2015) XP093292267, retrieved from the internet on Jul. 2, 2025 at: https://pmc.ncbi.nlm.nih.gov/articles/PMC4593023/pdf/hlv-07-246.pdf.
Paragonix LIVERguard™—Instructions, Donor Liver Perservation System, retrieved Mar. 3, 2026, XP093372371, in 12 pages.
Pargonix: "Paragonix Technologies Announces Expanded Adoption of their LIVERguard System at the 2022 American Transplant congress", Jun. 7, 2022, XP093372373, in 2 pages.
SamStores ("Frigidaire MFC09V4GW Chest Freezer 220-240 VOLT 50/60 HZ", retrieved online on Dec. 29, 2025, at: https://www.samstores.com/product-frigidaire-mfc09v4gw-chest-freezer-220-240-volt-5060-hz-7985.html?srsltid=aFmBOoq-kqrX3TYBATp2MXIyQoNj5_mgWVenhVW7UNyzTO8jilcorAAG, in 3 pages (2015).
Van Leeuwen et al., "Sequential hypothermic and normothermic machine perfusion enables safe transplantation of high-risk donor livers", American Journal of Transplantation, vol. 22(6):1658-1670 (2022).

(56) References Cited

OTHER PUBLICATIONS

Watanabe et al., “Ex vivo lung perfusion”, J Thorac Dis, vol. 13(11):6602-6617 (2021).
Yufer et al., “A tissue impendance measurement chip for myocardial ischemia detection”, IEEE Transactions on Circuits and Systems—I:Regular Papers, vol. 52(12):2620-2628 (2005).

* cited by examiner

Topside View

Physical Properties of Select Preservation Solutions

EC: Eurocollins, PBS: Phosphate-Buffered-Sucrose, HOC: Hypertonic Citrate, HTK: Histidine-Tryptohane-Ketoglutarate, UW: University of Wisconsin Cold Storage Solution, GSH: glutathion

| | EC | PBS | HOC | HTK | UW | Celsior |
|---|---|---|---|---|---|---|
| Na/K ratio | ↑K ↓Na | ↑Na ↓K | ↑Na ↓K | ↑Na ↓K | ↑K ↓Na | ↑Na ↓K |
| Buffer | Phosphate | Phosphate | Citrate | Histidine | Phosphate | Phosphate |
| Impermeants | Glucose | Sucrose | Mannitol<br>Citrate<br>Magnesium | Mannitol<br>Histidine<br>bionate | Raffinose<br>Lacto-<br>bionate | Mannitol<br>Lacto- |
| PH | 7.3 | 7.2 | 7.1 | 7.3 | 7.4 | 7.3 |
| Osmolality | 340 | 310 | 400 | 310 | 320 | 360 |

Substrates of Select Preservation Solutions

| | EC | PBS | HOC | HTK | UW | Celsior |
|---|---|---|---|---|---|---|
| Scavengers | | | | Mannitol | GSH | Mannitol |
| Substrates | | | | Keto-<br>glutarate | Adenosine | Glutamate |

FIG. 5

Compositions of Select Preservation Solutions

EC: EuroCollins, PBS: Phosphate-Buffered-Sucrose, HTK: Histidine-Tryptophaan-Ketoglutarate, UW: University of Wisconsin Cold Storage Solution, HOC: Hypertonic Citrate, HES: hydroxyethyl starch, ROS: reactive-oxygen-species

| | Collins | EC | UW | PBS | HTK | HOC | Celsior |
|---|---|---|---|---|---|---|---|
| ***Electrolytes (mM)*** | | | | | | | |
| *Calcium* | - | - | - | - | - | - | *0.26* |
| *Chloride* | *15* | *15* | *20* | - | *32* | - | *41.5* |
| *Magnesium* | *30* | - | *5* | - | *4* | *35* | *13* |
| *Phosphate* | *50* | *50* | - | *60* | - | - | - |
| *Potassium* | *115* | *115* | *100* | - | *9* | *80* | *15* |
| *Sodium* | *10* | *10* | *25* | *125* | *15* | *80* | *100* |
| *Sulphate* | *30* | - | *5* | - | - | *40* | - |
| ***Buffers (mM)*** | | | | | | | |
| *Citrate* | - | - | - | - | - | *55* | - |
| *Histidine* | - | - | - | - | *198* | - | *30* |
| *$K_2HPO_4$* | *15* | *15* | - | - | - | - | - |
| *$KH_2PO_4$* | *42.5* | *42.5* | *25* | - | - | - | - |
| *$Na_2HPO_4$* | - | - | - | *56* | - | - | - |
| *$NaHCO_3$* | *10* | *10* | - | - | - | - | - |
| *$NaH_2PO_4$* | - | - | - | *13* | - | - | - |
| ***Impermeants (mM)*** | | | | | | | |
| *Glucose* | *25* | *195* | - | - | - | - | - |
| *Histidine* | - | - | - | - | *198* | - | *30* |
| *Lactobionate* | - | - | *100* | - | - | - | *80* |
| *Mannitol* | - | - | - | - | *30* | *185* | *60* |
| *Raffinose* | - | - | *30* | - | - | - | - |
| *Sucrose* | - | - | - | *140* | - | - | - |
| ***Colloids (g/l)*** | | | | | | | |
| *HES* | - | - | *50* | - | - | - | - |
| ***ROS scavengers (mM)*** | | | | | | | |
| *Allopurinol* | - | - | *1* | - | - | - | - |
| *Glutathione* | - | - | *3* | - | - | - | *3* |
| *Mannitol* | - | - | - | - | *38* | *185* | *60* |
| *Tryptophan* | - | - | - | - | *2* | - | - |
| ***Substrates (mM)*** | | | | | | | |
| *Adenosine* | - | - | *5* | - | - | - | - |
| *Glutamate* | - | - | - | - | - | - | *20* |
| *Ketoglutarate* | - | - | - | - | *1* | - | - |

FIG. 6

| Alternative Configurations | | | | | |
|---|---|---|---|---|---|
| Configuration | Approx. mass (g) of PCM above preserved material | Approx. mass (g) of PCM below preserved material | Side View | Hours below 6°C | Hours below 8 °C |
| 1 | 2x1000 | 800 | 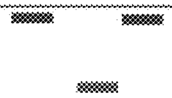 | >48 | >48 |
| 2 | 2000 | 800 | 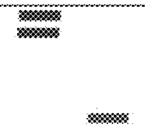 | 34.025 | >48 |
| 3 | 2000 | 800 | 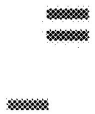 | 36.675 | >48 |
| 4 | 2800 | 0 |  | 11.425 | 46.575 |
| 5 | 1800+1000 | 0 |  | 20.29 | >48 |
| 6 | 1000+1800 | 0 |  | 12.22 | 44.95 |
FIG. 7

SYSTEM FOR HYPOTHERMIC TRANSPORT

INCORPORATION BY REFERENCE TO ANY PRIORITY APPLICATIONS

This application is a continuation of PCT/US2023/021241, filed on May 5, 2023, and titled SYSTEM FOR HYPOTHERMIC TRANSPORT, which claims the benefit of U.S. Provisional Application No. 63/339,087, filed May 6, 2022, and titled SYSTEM FOR HYPOTHERMIC TRANSPORT and U.S. Provisional Application No. 63/339,091, filed May 6, 2022, and titled SYSTEM FOR HYPOTHERMIC TRANSPORT. Each of the aforementioned applications is incorporated by reference herein in its entirety.

FIELD OF THE INVENTION

Aspects of the invention relate to systems and method for hypothermic transport of biological samples, for example tissues for donation. The systems and methods provide a secure, sterile, and temperature-controlled environment for transporting the samples.

BACKGROUND

There is a critical shortage of donor organs. Hundreds of lives could be saved each day if more organs (heart, kidney, lung, etc.) were available for transplant. While the shortage is partly due to a lack of donors, there is a need for better methods of preserving and transporting donated organs. Within the United States, over 60% of large organs (liver and lung) occur with a donor and recipient who are not local to each other and require that the organ be transported following donation. Current storage and preservation methods allow only a small time window between harvest and transplant, typically on the order of hours. These time windows dictate who is eligible to donate organs and who is eligible to receive the donated organs. These time windows also result in eligible organs going unused because they cannot be transported to a recipient in time.

While several state-of-the-art preservation methods are available to keep organs viable within a hospital, transport preservation typically involves simple hypothermic (less than 10° C.) storage. Current standard of care includes bagging the organ within flexible bags (such as 3M Steridrape) and then placed within a standard consumer cooler and packed with ice. This has been shown to lead to injury of the organ through uneven and unregulated temperatures as well as potential mechanical injury from localized pressure from the ice acting on the organ.

This method of transport has several known shortcomings, however. First, the temperature is not stabilized. Because the temperature of the organ is determined by the rate of melting and the thermal losses of the cooler, an organ will experience a wide range of temperatures during transport. For example, the temperatures can range from nearly 0° C., where the organ risks freezing damage, to 10-15° C., or greater, where the organ experiences greater tissue damage due to hypoxia. Common preservation solutions used for large organs are labeled for use in hypothermic conditions (e.g., 2° C.-6° C. for Belzer UW solution commonly used for livers and 2° C.-8° C. for Perfadex Solution commonly used for lungs). Accordingly, much of the temperature range experienced by an organ packing in ice in a cooler are outside of the operating temperatures for the preservation solutions used.

Additionally, there is little protection against mechanical shock. An organ sealed in bag and then placed in a cooler with ice is subject to bruising and abrasion as the organ contacts ice chunks or the sides of the cooler. Mechanical damage can be especially problematic when the organ is airlifted and the aircraft experiences turbulence.

Improved transport and storage for organs would increase the pool of available organs while improving outcomes for recipients.

SUMMARY

Aspects of the invention provide an improved system for transporting biological samples, e.g. tissues, such as donor organs. This improved system can greatly expand the window of time for organ transportation and, consequently, can make many more organs available for donation. Additionally, samples can remain healthier during transportation as compared to other transport methods.

The disclosed system for hypothermic transport overcomes the shortcomings of the prior art by providing a sterile, temperature-stabilized environment for the samples while providing the ability to monitor the temperature of the samples during transport. In certain embodiments, systems and methods herein use careful arrangement of specific cooling media around the biological sample and/or a bag or other container holding preservation fluid and the biological sample (e.g., tissue or an organ). Containers may include shelving or other physical features to support and separate the biological sample and surrounding cooling media.

Such arrangements may find particular application in preservation of large organs. The disclosed cooling media arrangements and containers operable to permit such arrangements can prevent freezing of the preserved material and maintain the biological sample within the labeled temperatures of preservation solutions by maintaining controlled hypothermic temperatures between 4° C.-8° C. for extended periods. Cooling media may include phase change materials (PCM) with specific phase change temperature above 0° C. to help maintain the desired sample temperature. In various embodiments, a specified ratio of latent heat to mass of preserved material may be provided to ensure proper preservation throughout cold ischemic time of the organ. The use of pockets and/or shelving within the container can allow for optimal location of cooling elements to provide hypothermic temperatures for extended preservation time and allows for the use of conductive cooling as the primary cooling method by suspending the biological sample and avoiding direct contact with cooling elements that may physically or thermally damage the sample.

Aspects of the invention can include containers for transporting a biological sample comprising: a sample storage chamber comprising a floor and walls and configured to receive a biological sample; a removable lid operable to couple with the walls; a first cooling media positioned on or near the floor; a removable sample support surface positioned above the cooling media operable to suspend the biological sample above the first cooling media and define a first cooling media pocket between the floor and the removable sample support surface; and a removable cooling media support surface positioned above the sample support surface. The removable cooling media support surface may be operable to suspend a second cooling media above the biological sample and define i) a sample storage pocket between the removable sample support surface and the removable cooling media support surface and second cooling media; and ii) a second cooling media pocket between the removable cooling media support surface and the removable lid. The removable sample support surface and the removable cooling media support surface can prevent direct contact and local conduction between the first cooling media, the second cooling media, and the biological sample.

In certain embodiments, the first and second cooling media can comprise a phase change material (PCM). The PCM may have a phase change formulated between about 0° C. and about 10° C. The PCM can have a melting temperature of about 1° C.+/−0.75° and a freezing temperature of about 0° C.+/−0.5°. In some embodiments the PCM may have a latent heat of about 200 J/g to about 400 J/g such as a latent heat of about 310 J/g. The container may include a total mass of PCM between about 1000 g and about 3000 g or between about 2600 g and about 2800 g. The second cooling media (above the biological sample) may include about 50% to about 80% of the total PCM in the container and the first cooling media (below the biological sample) may include about 20% to about 50% of the total PCM in the container. In certain embodiments, the second cooling media may include about 70% to about 75% of the total PCM in the container and the first cooling media may include about 25% to about 30% of the total PCM in the container.

In various embodiments, the first cooling media PCM can be centered below the biological sample. The second cooling media PCM may be distributed evenly across the removable cooling media support surface. The PCM may have a latent heat about 200 J/g and about 100 J/g for every gram of biological sample mass within the sample storage container.

The PCM may be contained in one or more laminated films. The one or more laminated films can have a water vapor transmission rate (WVTR) of less than about 5 $g/m^2$/day. In some embodiments, the one or more laminated films may have a WVTR of less than about 1 $g/m^2$/day.

In some embodiments, one or more of the walls can comprise one or more features extending into the sample storage chamber, and one or more of the removable sample support surface and the cooling media support surface are sized and shaped to interact with the one or more features to suspend one or more of the removable sample support surface and the removable cooling media support surface above the floor. One or more of the removable sample support surface and the cooling media support surface comprises an acrylic polymer to provide rigidity. One or more of the removable sample support surface and the cooling media support surface comprises a closed cell foam to provide cushioning and thermal insulation.

Aspects of the invention can include containers for transporting a biological sample, comprising: a sample storage chamber comprising a floor and walls and configured to receive a biological sample; a removable lid operable to couple with the walls; a cooling media positioned on or near the floor for maintaining a stable temperature within a sterile environment; a removable support surface positioned above the cooling media operable to support the biological sample, wherein the support surface comprises a plurality of layers configured to provide a biological sample cushion, thermal insulation, and physical separation and protection from the sample storage chamber and the cooling media.

In some embodiments, the removable support surface comprises a core layer operable to provide rigidity to support the biological sample and provide a barrier between the biological sample and the cooling media. In some embodiments, the core layer comprises a temperature probe positioned on a surface facing the biological sample. In some embodiments, the core layer comprises a relief sized and shaped to receive and position the temperature probe relative to the biological sample. In some embodiments, the core layer comprises an acrylic polymer. In some embodiments, one or more of the walls comprise a feature extending into the sample storage chamber, the support surface sized and shaped to interact with the feature to suspend the support surface and the biological sample above the cooling media and floor.

In some embodiments, the removable support surface comprises a cushion layer positioned between the biological sample and the core layer and configured to contact the biological sample. In some embodiments, the cushion layer comprises a thermal conductivity of 0.1 W/mK or less. In some embodiments, the cushion layer comprises a closed cell foam. In some embodiments, the cushion layer is contoured to correspond to a shape of the biological sample. In some embodiments, the cushion layer comprises a cutout positioned above the temperature probe such that no insulative material is in place between the temperature probe and the biological sample. In some embodiments, the cushion layer comprises a textured surface configured to interact with the biological sample or a bag containing the biological sample to increase a coefficient of friction therebetween to reduce lateral motion of the biological sample along the textured surface.

In some embodiments, the removable support surface comprises an insulating layer positioned between the cooling media and the core layer. In some embodiments, the insulating layer comprises a thermal conductivity of 0.1 W/mK or less. In some embodiments, the insulating layer comprises a closed cell foam. In some embodiments, the insulating layer comprises a cutout positioned below the temperature probe sized to receive an insulator plug positioned between the temperature probe and the cooling media. In some embodiments, the insulator plug comprises expanded polystyrene. In some embodiments, the expanded polystyrene has a density of about 2 $lb/ft^3$+/−10%. In some embodiments, the temperature probe comprises a temperature sensor within a blunt jacket to protect the biological sample or a bag containing the biological sample from damage. In some embodiments, the blunt jacket comprises stainless steel. In some embodiments, the temperature probe comprises a thermistor. In some embodiments, the removable support surface comprises a rigid layer positioned between the insulating layer and the cooling media. In some embodiments, the rigid layer provides rigidity to support the biological sample and provides a barrier between the insulating layer and the cooling media. In some embodiments, the rigid layer comprises an acrylic polymer.

The size and packaging of certain biological samples, such as livers, for transportation can create several problems during ex-vivo transportation. As noted, the organ should be protected from gross tissue damage induced during unintentional drops or vibration through motor, air, or human handling/transportation. However, the surface on which the organ rests while outside of the body cavity in many cases is simply a bed of ice that provides a hard, sometimes jagged surface that may damage the tissue. In contrast, systems and methods herein can provide a cushion, not a rigid surface, to prevent inducing pressure sores/injuries in the tissue. The cushion can be generally flat or may be contoured to match a generic profile of the tissue/organ being transported. A contoured cushion can increase the contact area supporting the tissue or organ and, therefore, better distribute pressure and avoid tissue damage. In some embodiments, a variety of tissue/organ specific cushions or trays may be available for a user to select from. In certain embodiments, multiple sizes of trays or cushions may be available. For example, a variety of liver cushions may be available that are sized to accommodate organs from donors of different ages, sexes, and/or sizes.

The cushion may be constructed of multiple layers to provide, for example, rigidity necessary to support the sample or organ and maintain separation between it and the cooling material and interior surfaces of the transport container. Other layers may provide the required cushioning between the rigid layer(s) and the sample or organ to further prevent physical trauma during transport. Layers may be selected based on their thermal conductivity to achieve desired insulation and/or thermal isolation of the sample, organ, active or passive cooling mechanisms, and/or any temperature probes. Certain layers may be composed of closed cell foam or other materials to provide insulation and cushioning while some layers may be composed of acrylic polymers or other rigid materials to provide structural support and a physical barrier between the tissue or organ and cooling material or other features of the container. Various layers may have reliefs or cutouts to accommodate and position a temperature probe or other sensor relative to the tissue/organ and cooling material.

For certain biological samples including organs such as livers, the packaging standard of care does not permit in-fluid temperature monitoring. In order to provide temperature tracking that most accurately reflects the temperatures experienced by the tissue (without damaging the tissue), systems and methods herein may rely on an external temperature probe. In certain embodiments, the cushioned support can be configured to accept a temperature probe herein in order to position the probe relative to the sample/organ to provide an accurate temperature reading (e.g., within +/−1° C.). In certain embodiments, the temperature probe may be coupled with an insulator of equivalent R-value, based on a surface ratio, to the size of the thermistor, to accurately measure temperature. A temperature sensor may be blunted itself of covered by a blunt or rounded jacket in order to reduce the change of physical damage to or piercing of the tissue or organ cause by contact with the temperature probe or sensor.

In certain embodiments, the biological sample may be partially suspended from above by an adapter to relieve some of the pressure between the sample and the supporting cushion or tray.

In certain embodiments, the samples may be exposed to an oxygenated preservation fluid. Systems and methods herein may additionally provide mechanisms, e.g. ports, to release trapped rising fluids, e.g., air, from the system while the system is being filled and operating. This feature prevents rising fluids from being recirculated in the preservation fluid and perfused into the tissues being preserved. This feature is especially important during loading, when air trapped in crevices of a container must be forced out so that the air will not form bubbles in the preservation fluid that could damage the tissues.

In some cases in which the sample is a tissue, the preservation solution may be circulated through the tissue using the tissue's cardiovascular system. In this case, a pulsed flow is used to imitate the natural environment of the tissue. Such conditions improve absorption of nutrients and oxygen as compared to static storage. Additionally, because compressed oxygen is used to propel the pulsed circulation, the preservation fluid is reoxygenated during transport, replacing the oxygen that has been consumed by the tissue and displacing waste gases (i.e., $CO2$). In some instances, a suite of sensors measures temperature, oxygen content, and pressure of the circulating fluids to assure that the tissue experiences a favorable environment during the entire transport.

The methods herein involve storing and/or transporting the severed tissue in a container in the presence of a preservation fluid, typically a pressurized, oxygenated preservation fluid. The container may additionally provide a time varying pressure greater than atmospheric pressure on the preservation fluid, thereby simulating for the interior tissues (muscles, nerves, etc.) a pressure environment analogous to that experienced when the tissue was attached. In some instances, the container will be kept at a hypothermal temperature in order to better preserve the tissue. In some instances, the preservation solution will contain nutrients and/or electrolytes.

In some instances, a system for the hypothermic transport of a biological sample includes a self-purging preservation apparatus and an insulated transport container for receiving the self-purging preservation apparatus and cooling media. The self-purging preservation apparatus includes an organ chamber and a lid assembly. The lid assembly has a pumping chamber with a semi-permeable membrane that is capable of exerting a force against a preservation fluid when a pressure is applied against the semi-permeable membrane. The self-purging preservation apparatus has a fill port to allow the preservation fluid to be added to the apparatus after the apparatus has been closed, and a purge port to allow the preservation fluid to exit the apparatus once filled. The purge port also allows a rising fluid to exit the apparatus during operation of the apparatus. In some instances, the self-purging preservation apparatus includes a temperature sensor. The self-purging preservation apparatus may also include a temperature display. The insulated transport container may be configured to hold a compressed oxygen source.

Systems for hypothermic transport of samples will be used to transport biological samples, such as tissues, organs, and body fluids. Methods may include providing a hypothermic transport system including a self-purging preservation apparatus and an insulated transport container for receiving the self-purging preservation apparatus and cooling media, suspending a biological sample in the preservation fluid in the first transport container, and maintaining a temperature of the preservation fluid between 2 and 8 or 2 and 10° C. for at least 60 minutes.

In one instance, a self-purging preservation apparatus herein is configured to oxygenate and perfuse the detached tissue. The self-purging preservation apparatus may also monitor the health of the tissue by measuring parameters such as oxygen consumption. The self-purging preservation apparatus includes a pneumatic system, a pumping chamber, and a tissue chamber. The pneumatic system is configured for the controlled delivery of fluid to and from the pumping chamber based on a predetermined control scheme. The predetermined control scheme can be, for example, a time-based control scheme or a pressure-based control scheme. The pumping chamber may additionally be configured to diffuse a gas into a perfusate and to generate a pulse wave for moving the perfusate through the tissue.

In some instances, the self-purging preservation apparatus is configured to substantially automatically purge excess fluid from the tissue chamber to the pumping chamber. The pumping chamber may then, in turn, be configured to self-purge excess fluid from the pumping chamber to an area external to the self-purging preservation apparatus. For example, the pumping chamber, disposed in the lid assembly, may be separated into first and second portions by a membrane, and the membrane disposed so that rising fluid will be directed to a highest point and then out of the container, for example, through a purge port.

In general, the design makes it easy for a doctor or technician to load an organ for transport securely and safely. Once loaded, the organ can be transported in a hyperthermic state in a static fashion or with ongoing pulsatile perfusion, thereby extending the ex corporal longevity of the organ for twelve hours or more. This extended transit time will greatly expand the donor pool for organs, and make it possible to store tissues for much longer periods prior to transport.

BRIEF DESCRIPTION OF THE DRAWINGS

FIG. 5 shows a table of physical properties of selected preservation solutions and a table of substrates of selected preservation solutions. The information in the tables is adapted from t'Hart et al. "New Solutions in Organ Preservation," *Transplantation Reviews* 2006, vol. 16, pp. 131-141 (2006).

FIG. 6 shows a table of compositions of selected preservation solutions. The information in the table is adapted from t'Hart et al. "New Solutions in Organ Preservation," *Transplantation Reviews* 2006, vol. 16, pp. 131-141 (2006).

FIG. 7 illustrates hypothermic performance of various arrangements of PCM material above and below a sample in a container.

DETAILED DESCRIPTION

The disclosed systems for hypothermic transport of samples provide a sterile, temperature-stabilized environment for transporting samples. In particular, systems and methods herein can include a specific configurations or arrangements of cooling media to prolong hypothermic storage/transport time in order to keep donor organs or other biological samples viable for longer periods. Storage or transport containers can provide shelving or support systems to facilitate a desired configuration of cooling media while preventing direct contact with the biological sample in order to avoid potential tissue damage. In certain embodiments, cooling media having specific characteristics (e.g., phase change materials with engineered phase change ranges and/or latent heat characteristics) may be used to increase desired hypothermic storage time.

Figure 2:
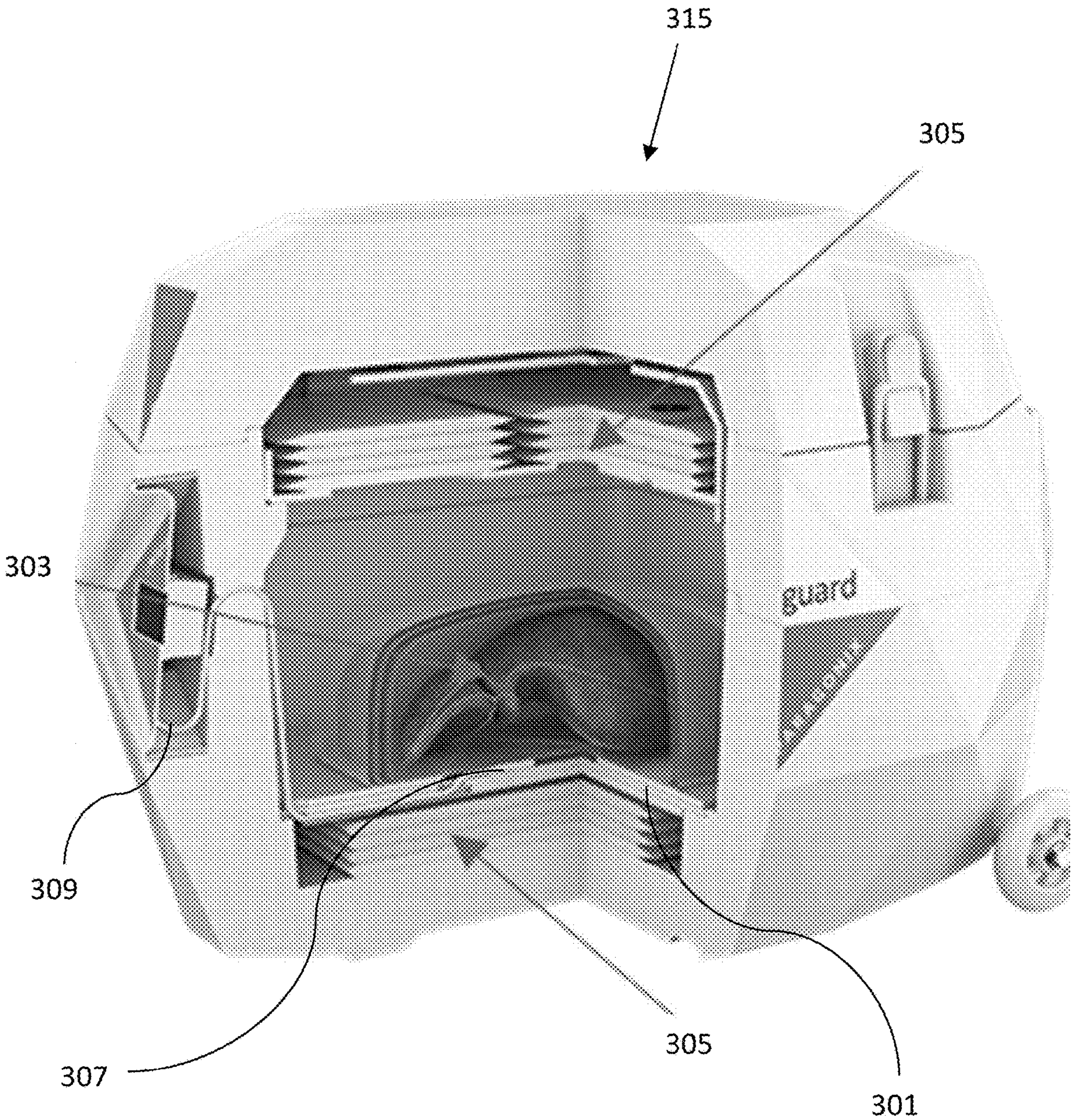
FIG. 2 is a cut-away view of a storage/transport container and sample support surface.

FIG. 2 illustrates an exemplary embodiment of a static tissue storage/transport container 315. The sample, tissue, or organ to be preserved 303 can be placed (along with preservation fluid) within one or more sterile bags such as those described in U.S. Pat. No. 11,166,452, incorporated herein by reference in its entirety. In certain embodiments, the tissue, sample, or organ may be entirely submerged in preservation fluid within the cavity of the container 315. The container 315 may include recesses, ridges, shelving, or other features to retain cooling systems 305 (either passive cooling media or active mechanisms). Exemplary phase change materials and eutectic cooling blocks are discussed below. The cooling systems 305 may be positioned below, above, and/or on the sides of a central cavity in which the sample 303 is placed. The support surface 301, for example, can be placed above the cooling systems 305 in order to provide a physical barrier between the sample 303 and the cooling systems 305 as shown in FIG. 2. The container 315 may include ridges or other features around the perimeter of the internal cavity operable to interact with edges of the support surface 301 to suspend it above the cooling systems 305. In certain embodiments, the support surface 301 may rest directly on the cooling systems 305. Exemplary support surfaces 301 are shown in more detail in FIGS. 3 and 4. The support surface may accept a temperature probe 307 which may wirelessly communicate with an output device to provide real-time temperature monitoring for the stored sample 303 or may be electrically connected to a to a transmitter, display, or other output device via a lead 309.

FIG. 2 illustrates a preferred arrangement of cooling systems 305 above and below the sample 303. The removable sample support surface 301 is positioned above the cooling media 305 and suspends the biological sample 303 above the cooling media 305, defining a pocket between the floor and the removable sample support surface 301. An additional removable cooling media support surface engages with a ridge or features around the perimeter of the container 315 interior to support additional cooling media 305 above the biological sample and defines a pocket containing the sample 303 and another pocket above the sample 303 containing the additional cooling media 305. The support surfaces prevent direct contact and local conduction between the cooling media 305 and the biological sample 303 which might otherwise damage the organ.

In preferred embodiments, the cooling media comprises a phase change material (PCM). Exemplary PCMs are discussed in more detail below. The container may include a total mass of PCM between about 1000 g and about 3000 g or between about 2600 g and about 2800 g. The second cooling media (above the biological sample) may include about 50% to about 80% of the total PCM in the container and the first cooling media (below the biological sample) may include about 20% to about 50% of the total PCM in the container. In certain embodiments, the second cooling media may include about 70% to about 75% of the total PCM in the container and the first cooling media may include about 25% to about 30% of the total PCM in the container.

In various embodiments, the first cooling media PCM can be centered below the biological sample. The second cooling media PCM may be distributed evenly across the removable cooling media support surface. The PCM may have a latent heat about 200 J/g and about 100 J/g for every gram of biological sample mass within the sample storage container.

FIG. 7 illustrates performance of exemplary arrangements of PCM materials where the "side view" column provides an illustration of the arrangement of individual blocks of PCM material where lines at the top of the row indicate material above the sample and lines at the bottom of the row indicate blocks of material below the sample. Configuration 1 includes two blocks of PCM (1000 g each) distributed across a support above the sample and one block of PCM (800 g) below the sample support shelf. That configuration maintained the sample at a temperature below 6° C. for greater than 48 hours. Configurations 2 and 3 show the same mass of PCM but arranged with the 2 blocks above the sample stacked and to one side or the other of the support shelf. Both configurations were able to maintain the sample temperature below 8° C. for greater than 48 hours but could not match the performance of configuration 1 despite using the same amount and type of PCM (see differences in hours below 6° C. performance). Adding additional PCM material above the sample in various configurations (4, 5, and 6) without PCM below also delivered worse performance relative to the first configuration where PCM is centered below the sample and distributed above it. FIGS. 8-18 plot the temperature data for the various configurations shown in FIG. 7 as well as control configurations including direct contact, open air, and no-saline controls. In the graphs the upper line is ambient temperature and the lower line is the probe temperature indicative of the temperature experienced by a sample in the container over that time.

In various embodiments, the PCM may be contained in one or more laminated films. The one or more laminated films can have a water vapor transmission rate (WVTR) of less than about 5 $g/m^2$/day. In some embodiments, the one or more laminated films may have a WVTR of less than about 1 $g/m^2$/day. Exemplary laminated films may include nylon for puncture resistance and EVOH as a moisture barrier. Suitable films are commercially available including X2030 available from Protect-All, Inc. (Darien, WI) and Pluss Plain Laminate 162μ OP Nylon Multilayer Film 350 mm available from Shrinath Rotopack Pvt. Ltd. (India).

Support surfaces may further be designed to cushion and support an organ or other biological sample to reduce the risk of trauma during transport or storage. Such support surfaces can provide both cushioning and structural support to physically separate the sample from direct exposure to cooling media. In certain embodiments, the support surface can be used to position a temperature probe in an optimal location to provide accurate temperature readings for the sample without physically damaging the sample. The support surface can be operable to fit inside of a transport container for static or perfusion storage. The container can provide an ability to self-purge the system of rising fluids, e.g., trapped gas. Some systems also provide the ability to monitor the temperature, or other properties of the samples, during transport. Because of these improvements, users can reliably transport samples over much greater distances, thereby substantially increasing the pool of available tissue donations. Additionally, because the tissues are in better condition upon delivery, the long-term prognosis for the recipient is improved.

Hypothermic transport systems herein comprise static storage containers and insulated transport containers. Apparatuses herein can receive tissue for storage or transport, and keep it suspended or otherwise supported temperature controlled, sterile environment and optionally in a surrounding pool of preservation solution. Containers may include self-purging systems where the container is filled with preservation solution and may comprise a number of configurations suitable to transport tissues in a hypothermic manner.

In some embodiments, the storage or transport container will include a pumping mechanism to circulate the preservation solution or perfuse an organ with the preservation solution. A storage or transport container comprising a pumping chamber will be referred to as "pulsatile." While the pumping is pulsating in preferred embodiments, the pumping is not intended to be limited to pulsating pumping, that is, the pumping may be continuous. In other embodiments, the storage or transport container will not circulate or perfuse the preservation solution. A non-pumping storage or transport container will be referred to as "static."

In some embodiments, a device is configured to self-purge excess fluid (e.g., liquid and/or gas). For example, in some embodiments, a device includes a lid assembly in which at least a portion of the lid assembly is inclined with respect to a horizontal axis. The inclined portion of the lid assembly is configured to facilitate the flow of fluid towards a purge port disposed at substantially the highest portion of a chamber of the lid assembly. In this manner, excess fluid can escape the device via the purge port. Also in this manner, when excess liquid is expelled from the device via the purge port, an operator of the device can determine that any excess gas has also been purged from the device, or at least from within a tissue chamber of the device, because the gas is lighter than the liquid and will move towards and be expelled via the purge port before excess liquid.

In some embodiments, a device is configured to pump oxygen through a pumping chamber to oxygenate a perfusate and to perfuse a tissue based on a desired control scheme. For example, in some embodiments, the device includes a pneumatic system configured to deliver oxygen to the pumping chamber on a time-based control scheme. The pneumatic system can be configured to deliver oxygen to the pumping chamber for a first period of time. The pneumatic system can be configured to vent oxygen and carbon dioxide from the pumping chamber for a second period of time subsequent to the first period of time. In another example, in some embodiments, the device includes a pneumatic system configured to deliver oxygen to the pumping chamber on a pressure-based control scheme. The pneumatic system can be configured to deliver oxygen to the pumping chamber until a first threshold pressure is reached within the pumping chamber. The pneumatic system can be configured to vent oxygen and carbon dioxide from the pumping chamber until a second threshold pressure is reached within the pumping chamber. In some embodiments, a power source of the device is in use when oxygen is being delivered to the pumping chamber and is not in use when oxygen and carbon dioxide are being vented from the pumping chamber. In this manner, the device is configured to help minimize usage of the power source, and thus the device can prolong the period of time a tissue is extracorporeally preserved within the device before the power source is depleted. Such an improvement increases the time available for transporting the tissue to a hospital for replantation.

As used in this specification, the singular forms "a," "an" and "the" include plural referents unless the context clearly dictates otherwise. Thus, for example, the term "a fluid" is intended to mean a single fluid or a combination of fluids.

As used herein, "a fluid" refers to a gas, a liquid, or a combination thereof, unless the context clearly dictates otherwise. For example, a fluid can include oxygen, carbon dioxide, or another gas. In another example, a fluid can include a liquid. Specifically, the fluid can be a liquid perfusate. In still another example, the fluid can include a liquid perfusate with a gas, such as oxygen, mixed therein or otherwise diffused therethrough.

As used herein, "tissue" refers to any tissue of a body of a patient, including tissue that is suitable for being replanted or suspected of being suitable for replantation. Tissue can include, for example, muscle tissue, such as, for example, skeletal muscle, smooth muscle, or cardiac muscle. Specifically, tissue can include a group of tissues forming an organ, such as, for example, the skin, lungs, cochlea, heart, bladder, liver, kidney, or other organ. In another example, tissue can include nervous tissue, such as a nerve, the spinal cord, or another component of the peripheral or central nervous system. In still another example, tissue can include a group of tissues forming a bodily appendage, such as an arm, a leg, a hand, a finger, a thumb, a foot, a toe, an car, genitalia, or another bodily appendage. While the systems are described as relating to the transport of tissues, such as organs, it is also envisioned that the systems could be used for the transport of body fluids, which may be held in another container within the storage or transport container. Body fluids may include blood and blood products (whole blood, platelets, red blood cells, etc.) as well as other body fluids for preservation.

Figure 3:
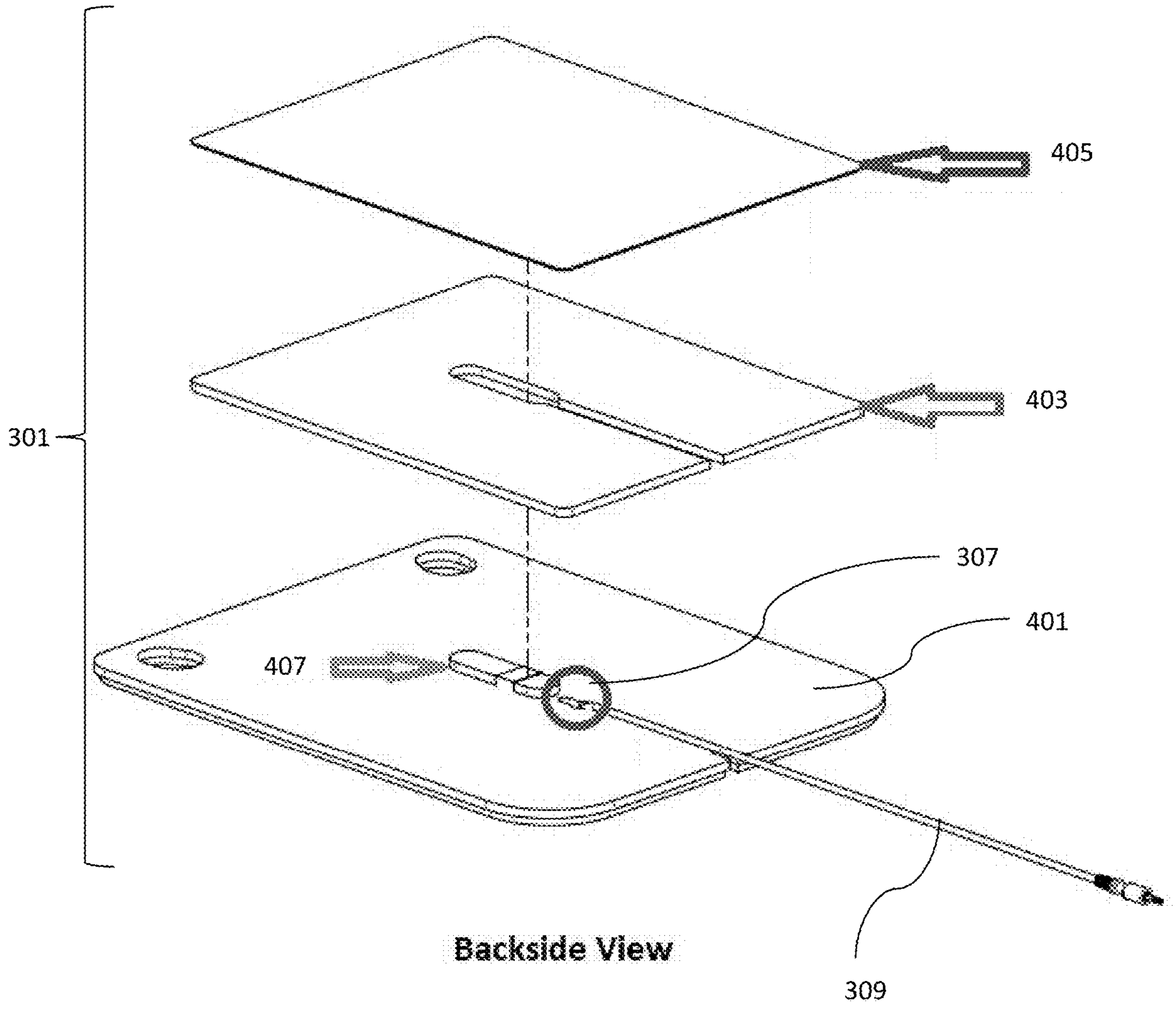
FIG. 3 is an exploded backside view of a sample support surface.
Figure 4:
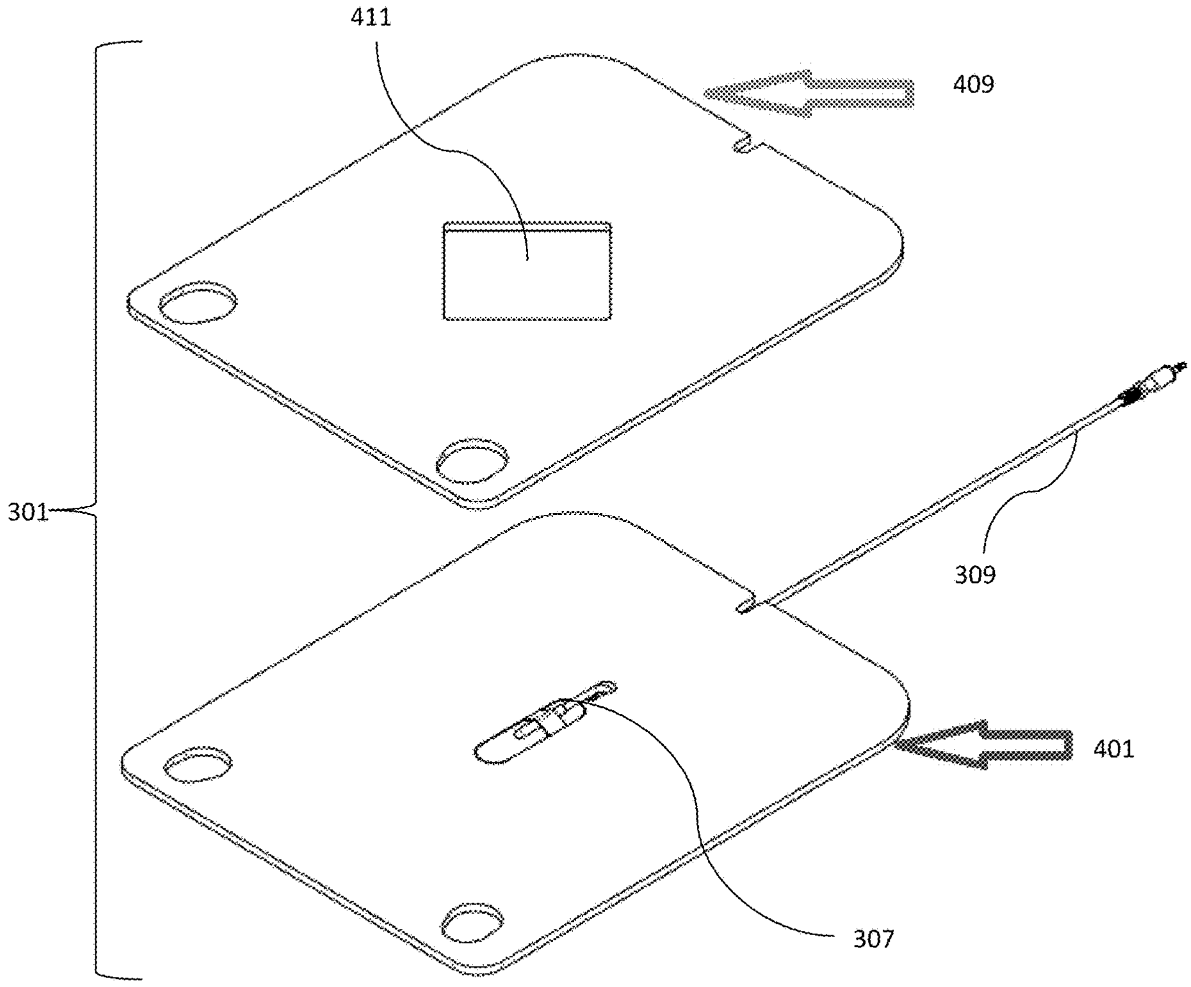
FIG. 4 is an exploded topside view of a sample support surface.
Figure 8:
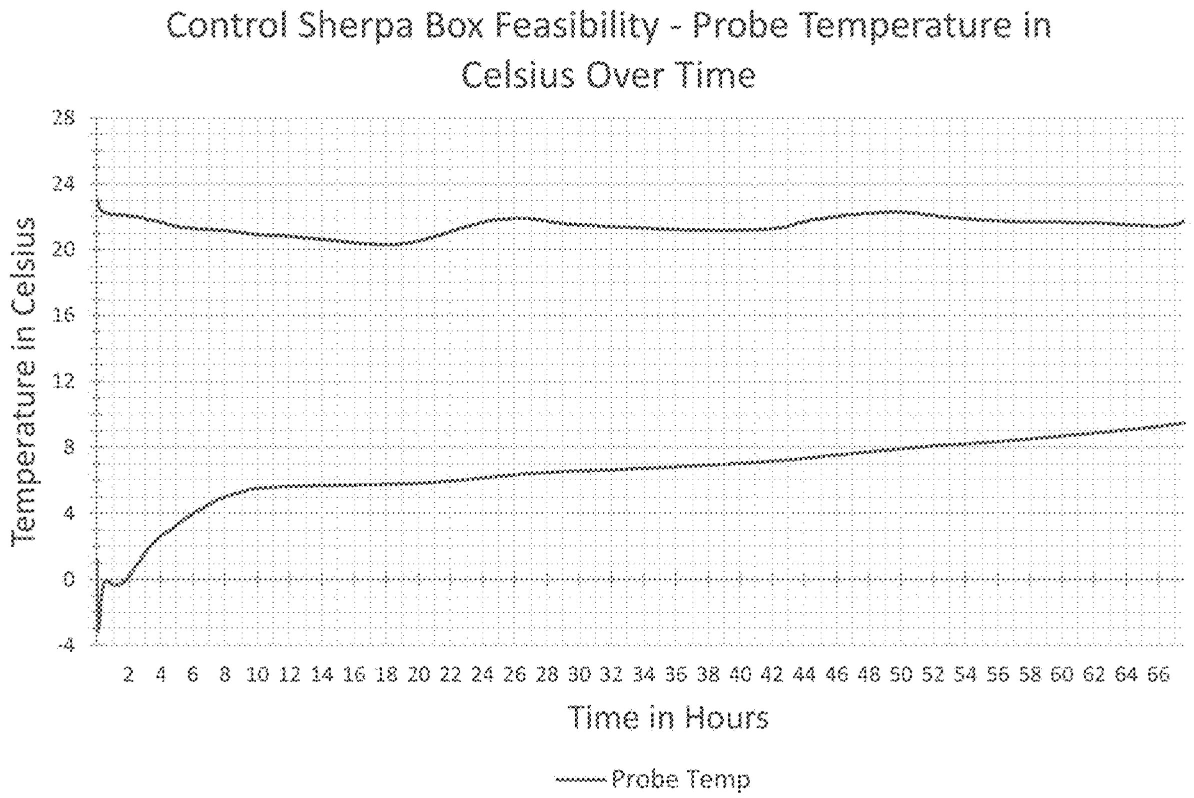
FIG. 8 plots probe temperature (indicative of sample temperature) and ambient temperature over time in an open box control.
Figure 9:
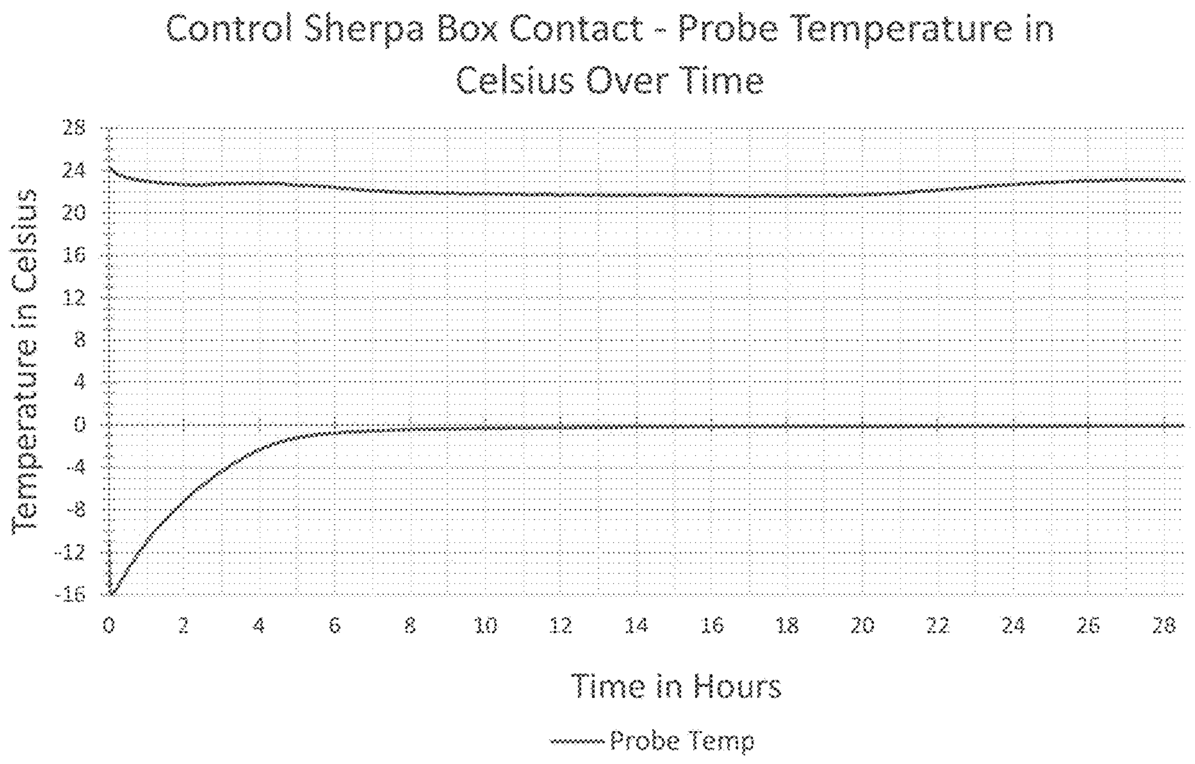
FIG. 9 plots probe temperature (indicative of sample temperature) and ambient temperature over time in a contact control for 29 hours.
Figure 10:
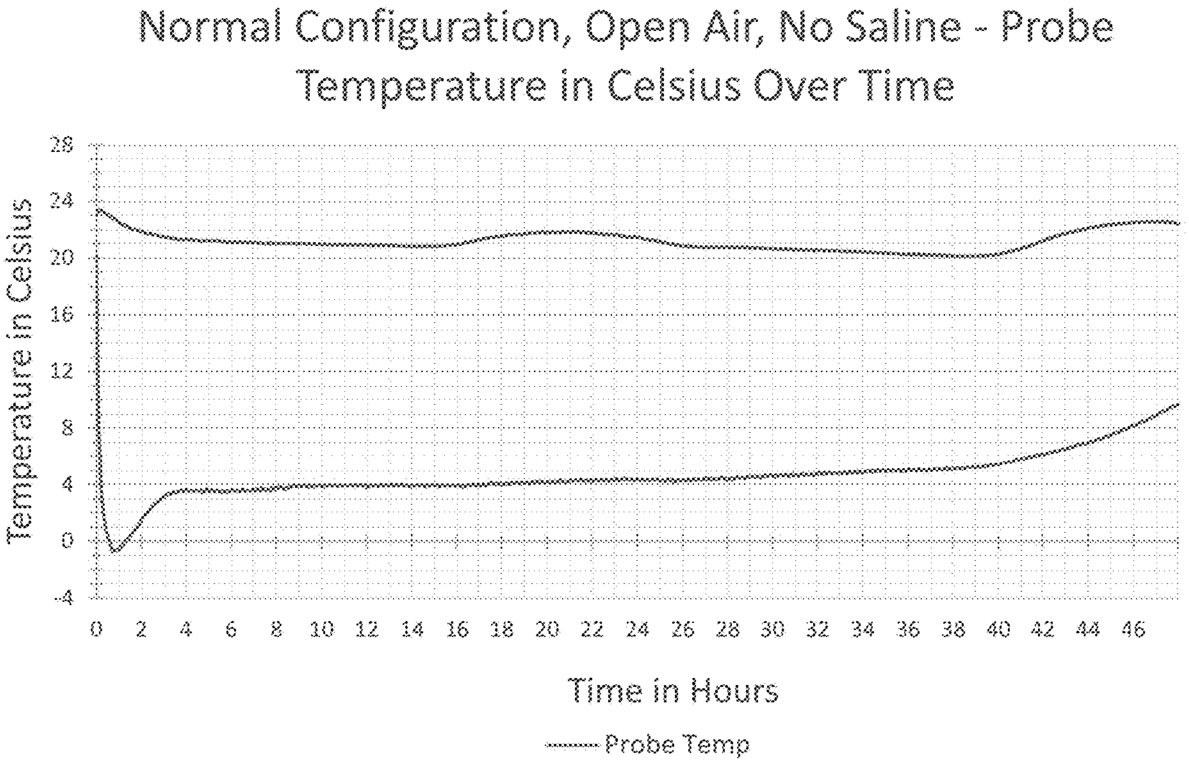
FIG. 10 plots probe temperature (indicative of sample temperature) and ambient temperature over time in an open-air configuration with no saline.
Figure 11:
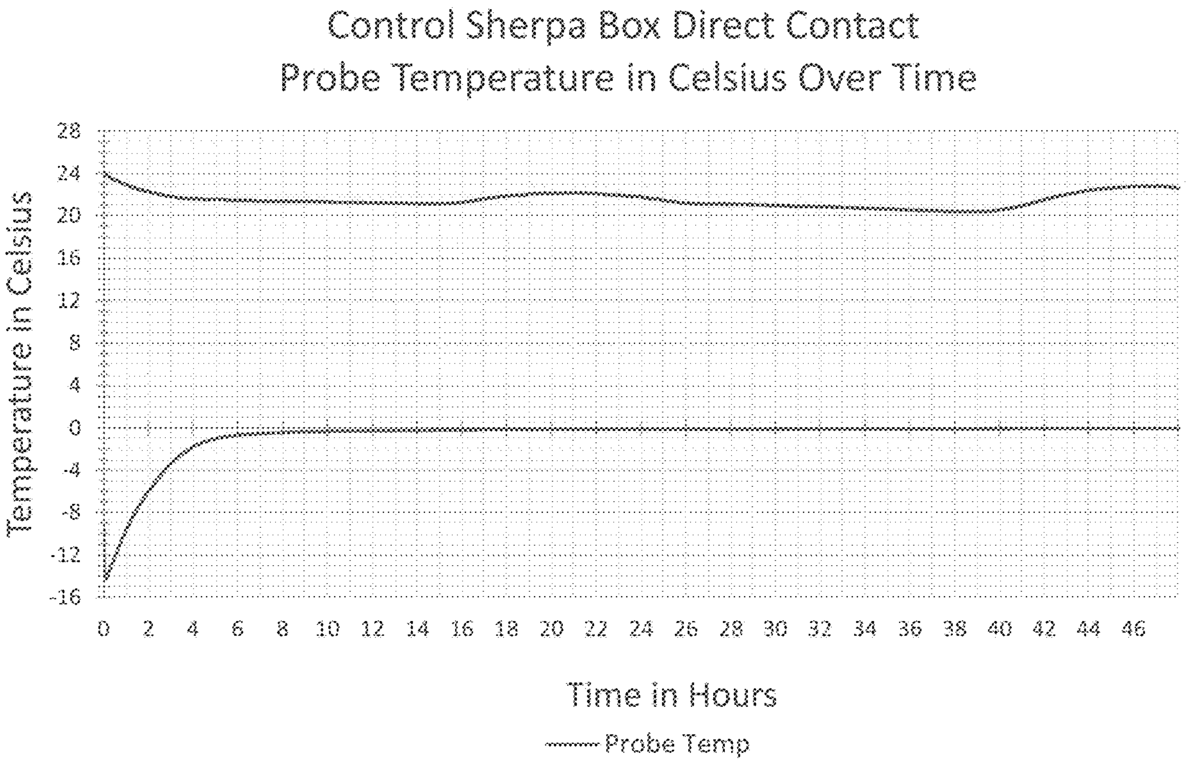
FIG. 11 plots probe temperature (indicative of sample temperature) and ambient temperature over time in a contact control for 48 hours.
Figure 12:
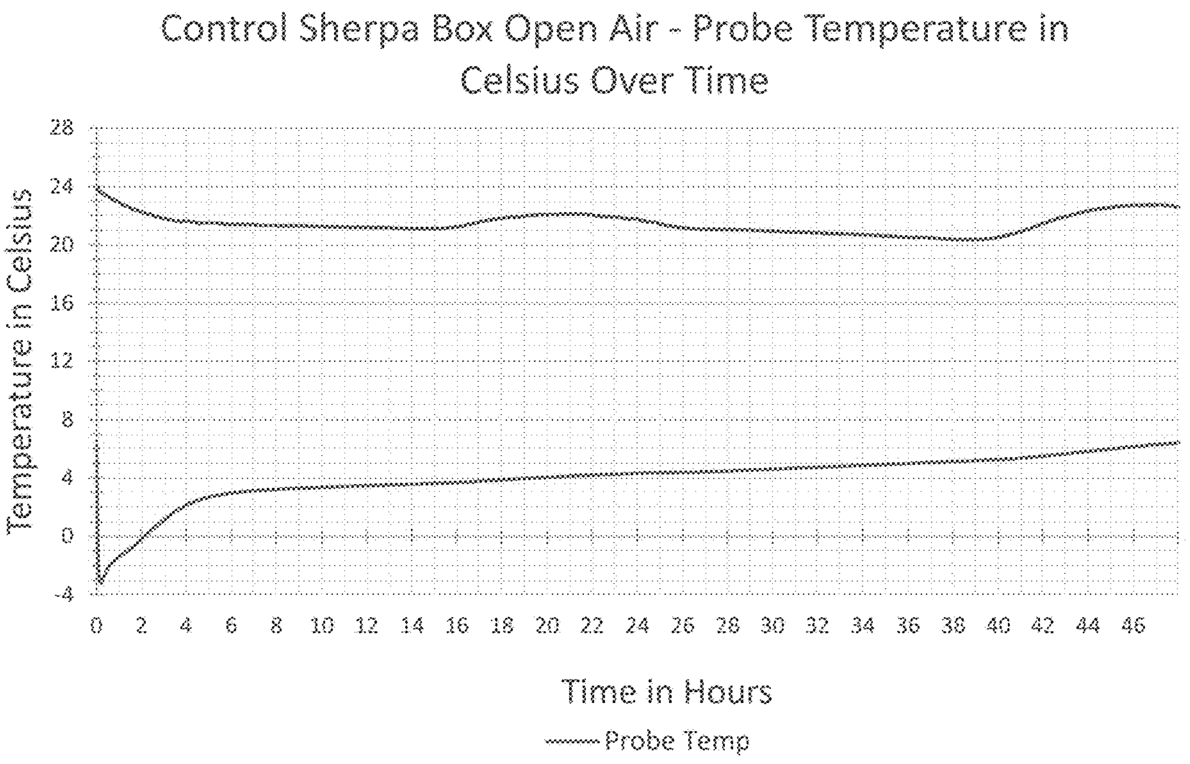
FIG. 12 plots probe temperature (indicative of sample temperature) and ambient temperature over time in an open box control for 48 hours.
Figure 13:
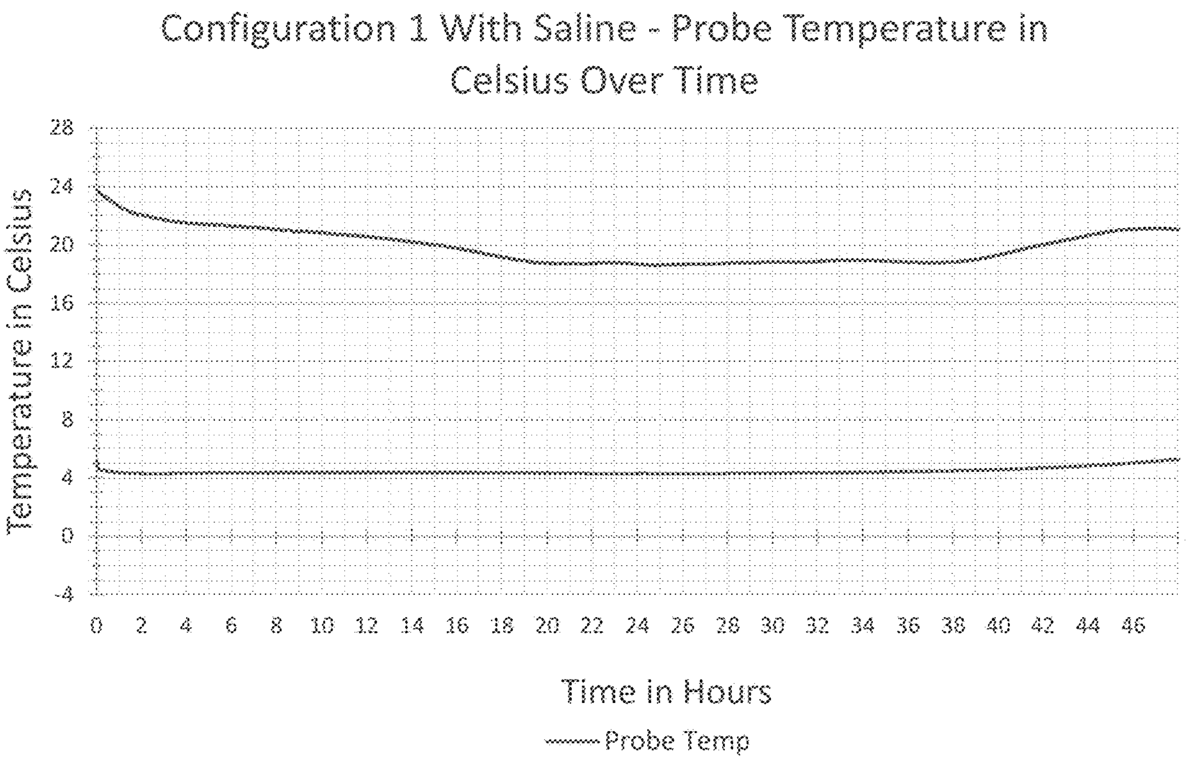
FIG. 13 plots probe temperature (indicative of sample temperature) and ambient temperature over time in configuration 1.
Figure 14:
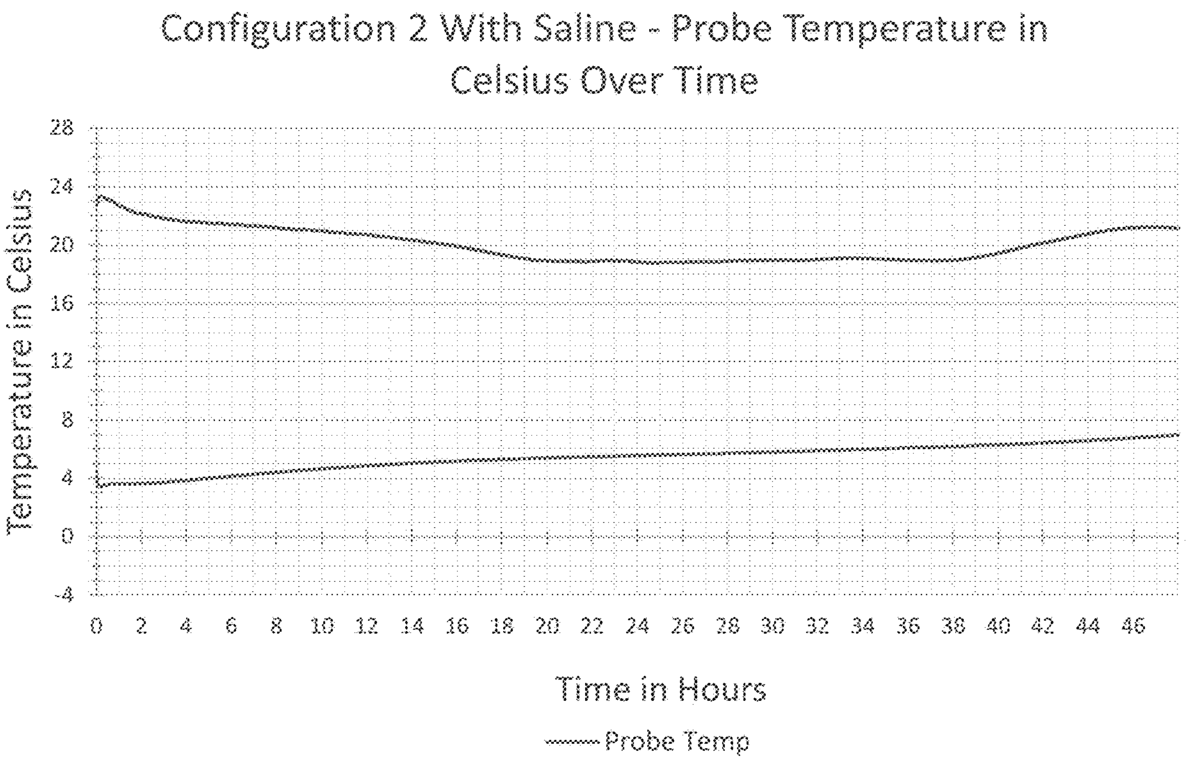
FIG. 14 plots probe temperature (indicative of sample temperature) and ambient temperature over time in configuration 2.
Figure 15:
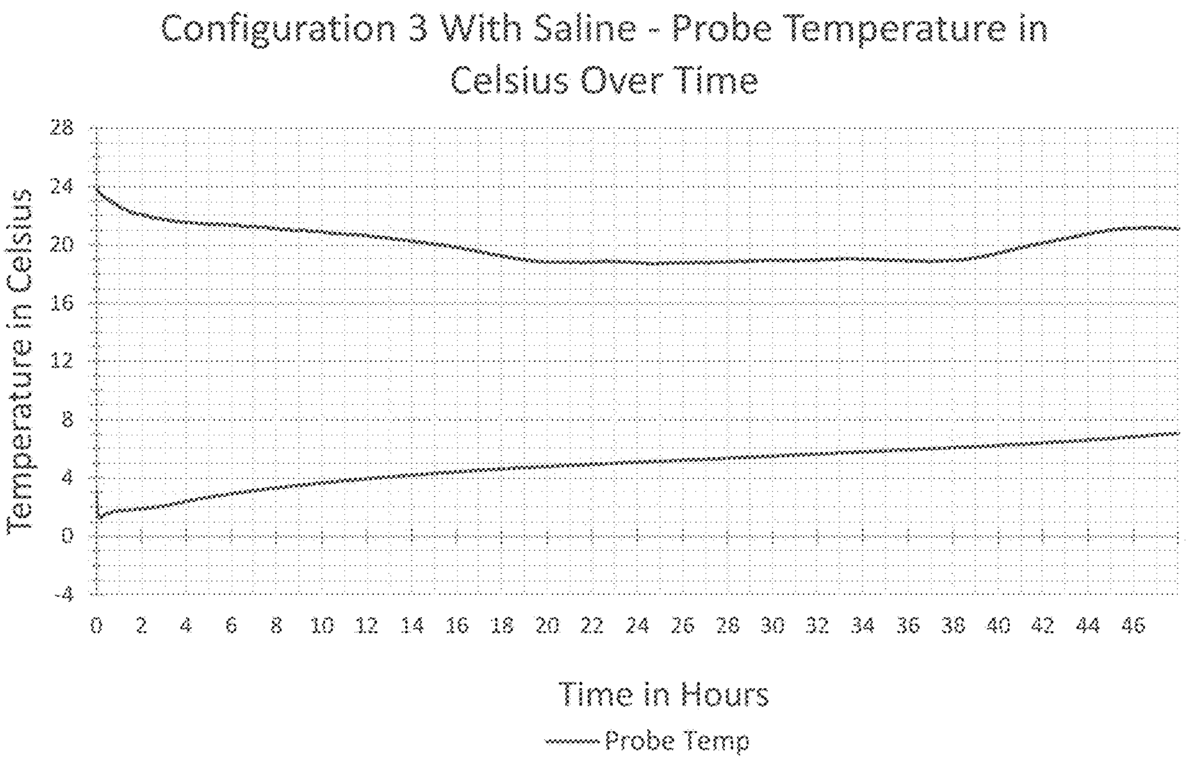
FIG. 15 plots probe temperature (indicative of sample temperature) and ambient temperature over time in configuration 3.
Figure 16:
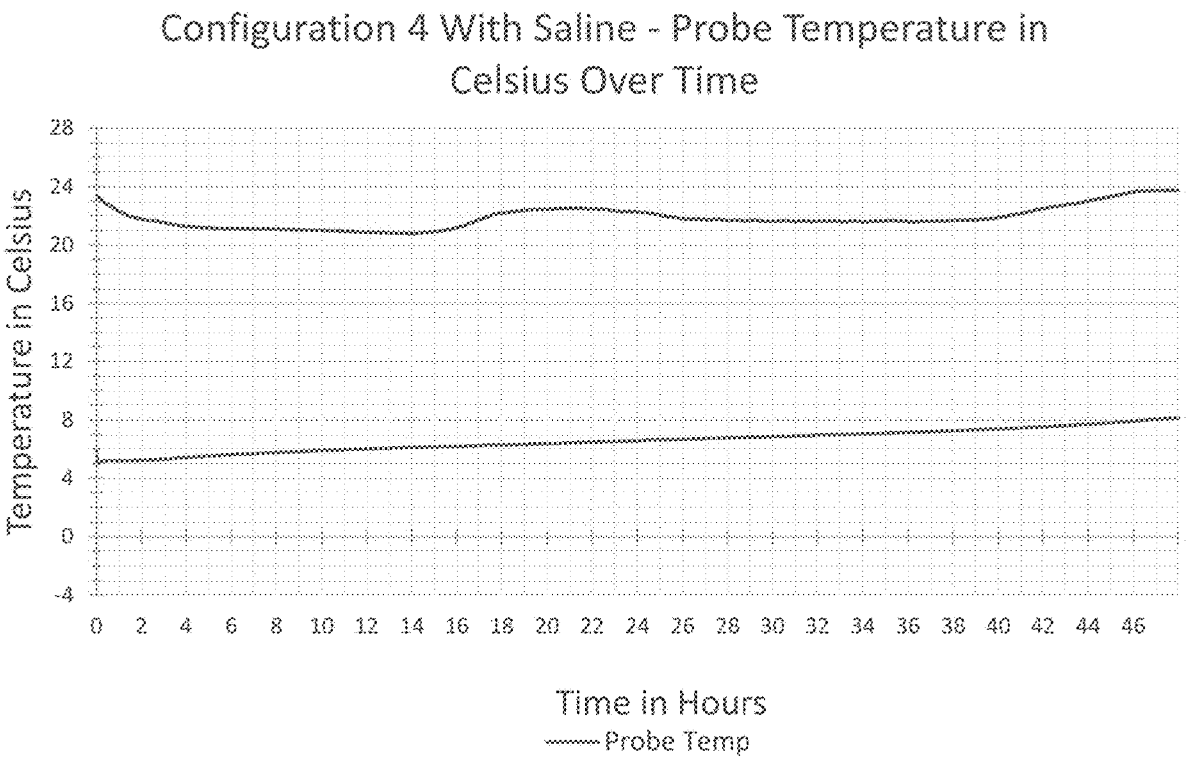
FIG. 16 plots probe temperature (indicative of sample temperature) and ambient temperature over time in configuration 4.
Figure 17:
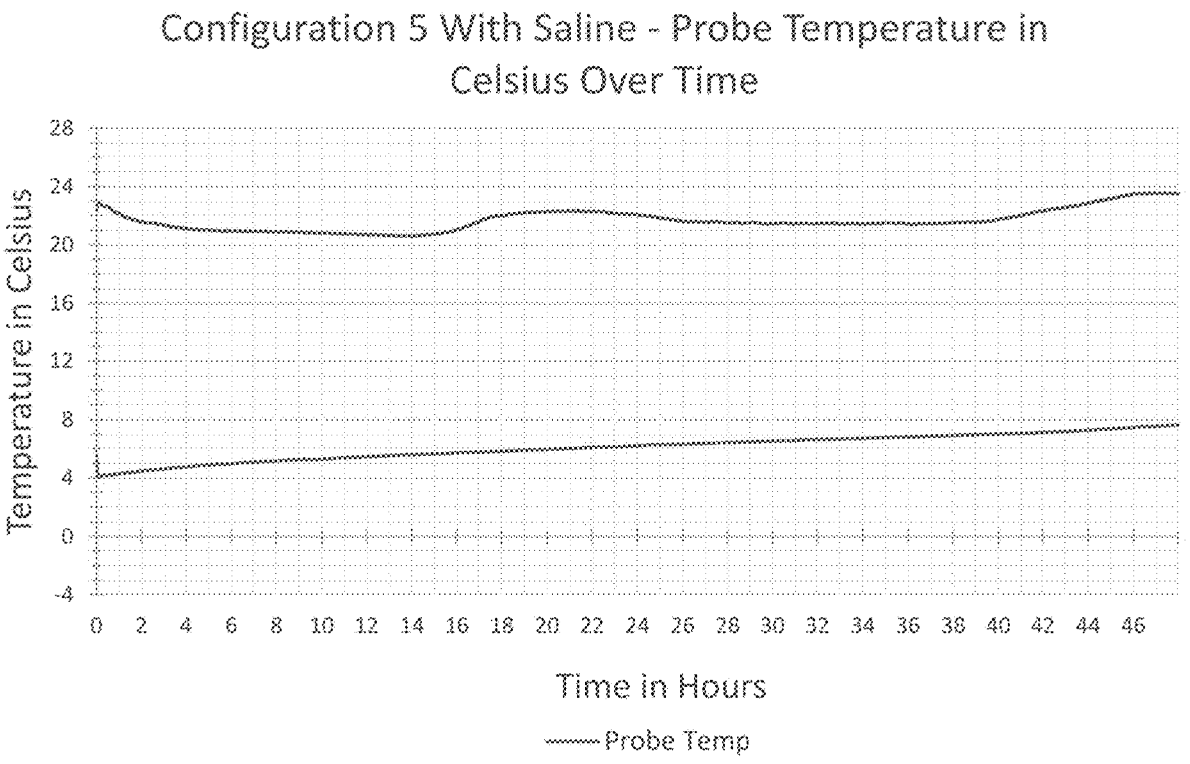
FIG. 17 plots probe temperature (indicative of sample temperature) and ambient temperature over time in configuration 5.
Figure 18:
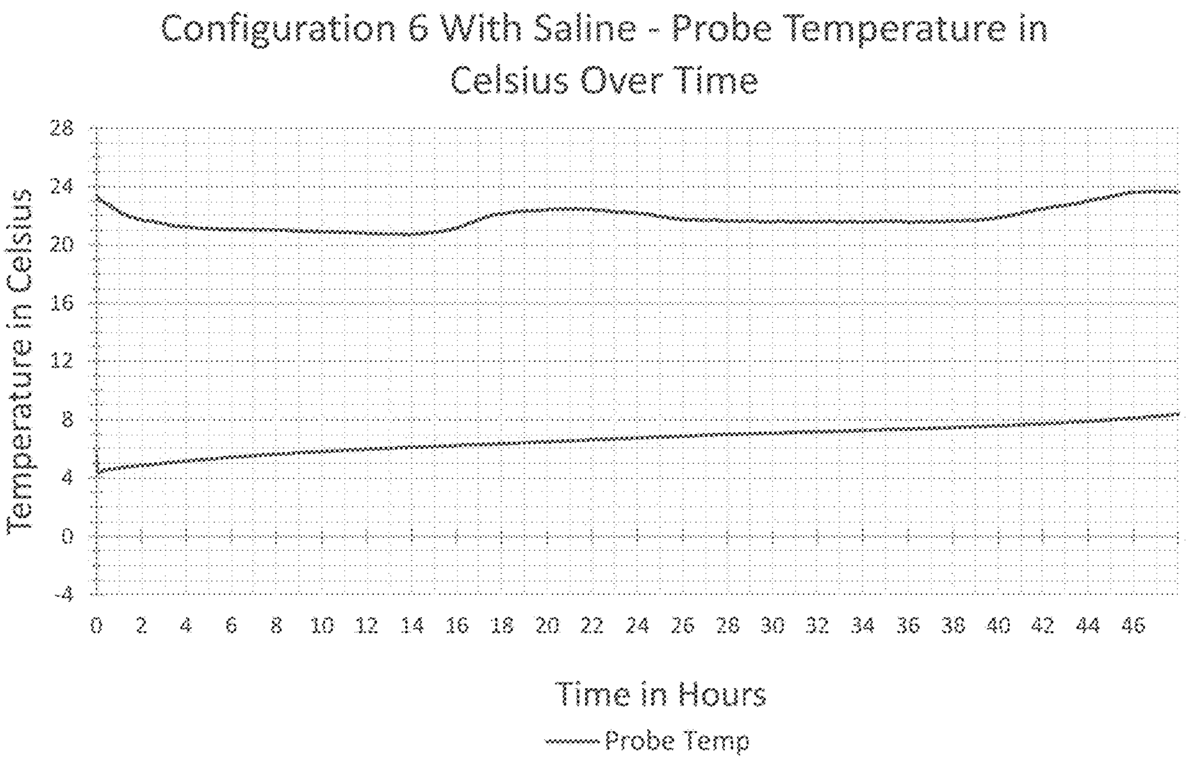
FIG. 18 plots probe temperature (indicative of sample temperature) and ambient temperature over time in configuration 6.

FIG. 3 shows a backside view of an exemplary support surface 301 including various layers (401, 403, and 405) to provide physical and/or thermal insulation and support for the sample and temperature probe 307. FIG. 4 shows a topside view of the support surface 301 and other layers (409) for providing structure, support, insulation, and cushioning.

In the embodiment illustrated in FIGS. 3 and 4, a core layer 401 may be constructed from a material with sufficient rigidity to provide support, without significant deformation, of the sample when suspended by tabs around the perimeter of the inside of the container (as in the configuration depicted in FIG. 2). In various embodiments, the core layer 401 may comprise a rigid acrylic polymer or other material to provide a structurally appropriate surface to maintain separation between the passive cooling packets and the solid organ. In preferred embodiments, the material is biocompatible as it may be in contact or close proximity with tissue or an organ. A temperature probe 307 such as a thermistor along with an electrical lead 309 may be secured to the core layer 401 so as to position the probe 307 on the surface of the core layer 401 facing the sample.

An insulating layer 403 can be placed below the core layer 401 to act as a thermal barrier between cooling material below the insulating layer and the sample on the other side thereof. The insulating layer 403 can include recesses or cutouts to accommodate/position the temperature probe 307 and/or lead 309. The insulating layer 403 can provide appropriate thermal conductivity between passive cooling packets or active cooling mechanisms and the solid organ or other biological samples. The insulating layer 403 may have a thermal conductivity of less than about 0.1 W/mK or, some embodiments, less than about 0.05 W/mK. In certain embodiments, the insulating layer 403 may be constructed of a closed cell foam such as Plastazone LD24 (available from Zotefoams Plc, UK) with a thermal conductivity of about 0.04 W/mK. The insulating layer 403 may contain a cutout or relief to accept and position an insulator plug 407 between the temperature probe 307 and cooling material below the surface 301 in order to more accurately measure the temperature of the sample without interference from the cooling material itself.

The insulator plug 407 can therefore provide a validated temperature reading via the attached temperature probe 307 (e.g., thermistor). The temperature probe 307 is preferably coupled to an insulator plug 407 having an equivalent R-value, based on a surface ratio to the size of the thermistor, in order to accurately measure temperature. In certain embodiments, the insulator plug 407 may comprise expanded polystyrene with a density of about 2 $lb/ft^3$+/−10%. In various embodiments, the temperature probe may comprise a thermistor or other temperature sensor situated or affixed inside of a blunt-tip jacket (e.g., a stainless steel or other medically acceptable material) in order protect the thermistor and/or probe tip from piercing or otherwise damaging the tissue or any isolation bags which might contain the sample and/or preservation fluid. In preferred embodiments, the aforementioned temperature probe arrangement can provide indirect temperature within +/−1° C. of a solid organ as compared to present standard of care which does not measure temperature. As opposed to perfusion models where the temperature of the perfusion fluid can be monitored to reflect the organ temperature, the aforementioned arraignment is of particular use in static storage and transport (e.g., for liver) in which in-fluid temperature monitoring is not possible.

One or more additional rigid layers 405 may be included to provide a structurally appropriate surface to maintain separation between the cooling mechanism and the insulating layer 403 and the solid organ or other sample. The additional rigid layer 405 may be the same or a similar material to that of the core layer 401. As shown in the topside view of the support surface 301, a cushion layer 409 may be provided on top of the core layer 401 in order to provide an atraumatic cushion for the solid organ or other sample to rest on. The cushion layer 409 may be specifically utilized to protect the sample from bouncing on a hard surface during transit and/or sliding within the device on a smooth surface and protect against thermal conductivity of the rigid core layer 401 below. The cushion layer may comprise a closed cell foam as with the insulation layer (e.g., Plastazote LD24) and may provide further thermal insulation to more conductive polymer layers underneath. The surface of the cushion layer 409 and/or any sample container bags (e.g., organ bags exemplified in U.S. Pat. No. 11,166,452) may be textured in order to increase friction and reduce sliding or other lateral movement of the organ relative to the support surface 301 during transport.

Accordingly, support surfaces as described herein can remove direct contact with a cold energy source and provide an atraumatic cushion for the sample as compared to the present standard of care which places a bagged solid organ directly on ice and does not support the organ from pressure injury. Such support surfaces may have particular application with livers other organs where standard packaging for transportation creates problems during ex-vivo transportation.

In various embodiments, the entire support surface or at least the topmost cushion layer may be curved or otherwise shaped to accommodate curvature of the tissue to be transported. In some embodiments, netting or other restraints may be used to retain the sample on the cushioned support surface. Support surfaces may be contoured not just for different generic profiles of different organs but also sub-categories based on the size, age, and/or gender of the donor to ensure a close fit. In certain embodiments, a support surface may be molded/prepared at the donor site to custom fit an organ before transport.

Figure 1:
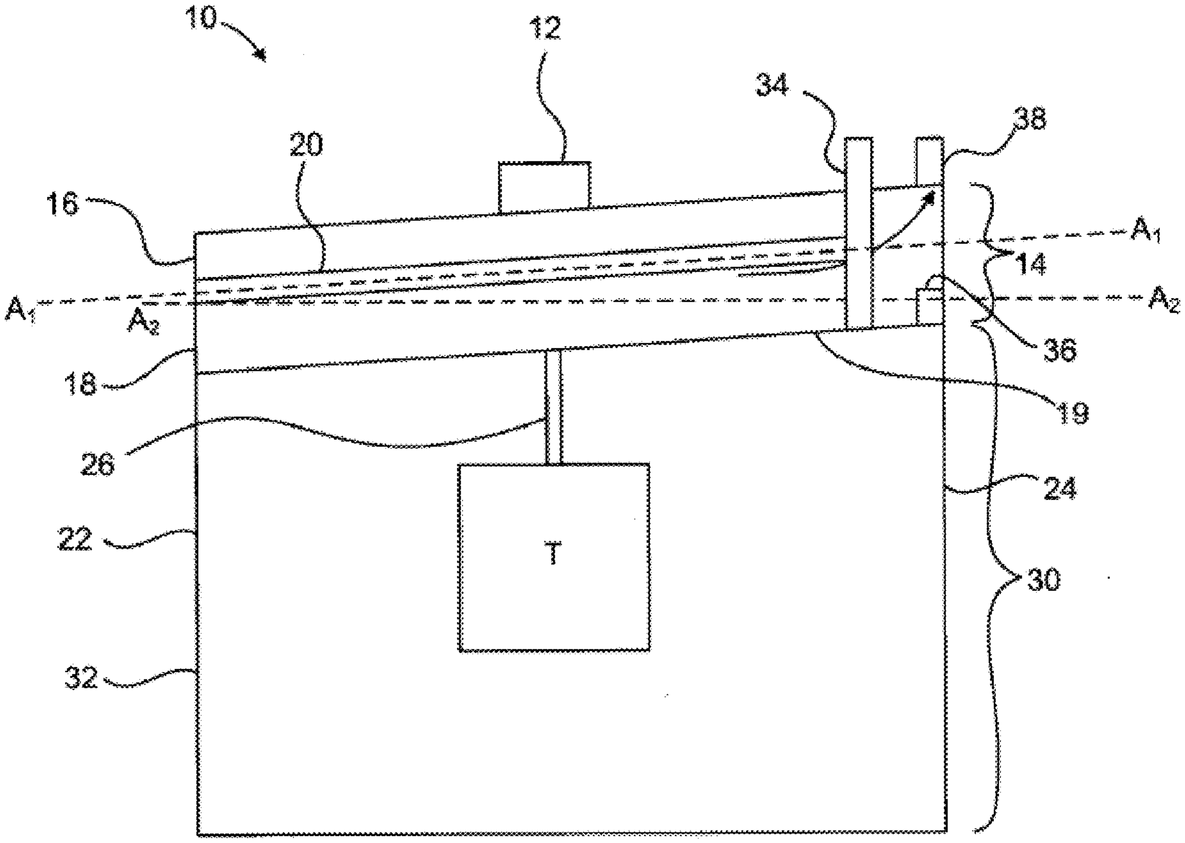
FIG. 1 is a schematic illustration of a self-purging preservation apparatus.

Support surfaces may contain any number and thicknesses of layers described above. For example, a support surface may include 2, 3, 4, or more insulation layers. Support surfaces and arrangements described herein are contemplated for use in any variety of static and perfusion devices including self-purging preservations apparatuses as described in U.S. Pat. No. 11,178,866, incorporated herein by reference in its entirety. An exemplary self-purging preservation apparatus 10 according to an embodiment is schematically illustrated in FIG. 1. The self-purging preservation apparatus 10 is configured to oxygenate a perfusate (not shown) received in a pumping chamber 14 of the self-purging preservation apparatus. The self-purging preservation apparatus 10 includes a valve 12 configured to permit a fluid (e.g., oxygen) to be introduced into a first portion 16 of the pumping chamber 14. A membrane 20 is disposed between the first portion 16 of the pumping chamber 14 and a second portion 18 of the pumping chamber. The membrane 20 is configured to permit the flow of a gas between the first portion 16 of the pumping chamber 14 and the second portion 18 of the pumping chamber through the membrane. The membrane 20 is configured to substantially prevent the flow of a liquid between the second portion 18 of the pumping chamber 14 and the first portion 16 of the pumping chamber through the membrane. In this manner, the membrane can be characterized as being semi-permeable.

The membrane 20 is disposed within the pumping chamber 14 along an axis A1 that is transverse to a horizontal axis A2. Said another way, the membrane 20 is inclined, for example, from a first side 22 to a second side 24 of the self-purging preservation apparatus 10. The membrane may be inclined at an angle between 0.5° and 40° relative to horizontal, e.g., between 1° and 30°, e.g., between 5° and 25°, e.g., between 10° and 20°. For example, the membrane may be inclined at an angle between 1° and 10°. As such, as described in more detail below, a rising fluid in the second portion 18 of the pumping chamber 14 will be directed by the inclined membrane 20 towards a port 38 disposed at the highest portion of the pumping chamber 14, thereby allowing the rising fluid to leave the apparatus during filling or during transport. The vent port 38 is configured to permit the fluid to flow from the pumping chamber 14 into the atmosphere external to the self-purging preservation apparatus 10. In some embodiments, the vent port 38 is configured for unidirectional flow, and thus is configured to prevent a fluid from being introduced into the pumping chamber 14 via the port (e.g., from a source external to the self-purging preservation apparatus 10). In some embodiments, the vent port 38 includes a luer lock.

The second portion 18 of the pumping chamber 14 is configured to receive a fluid. In some embodiments, for example, the second portion 18 of the pumping chamber 14 is configured to receive a liquid perfusate. The second portion 18 of the pumping chamber 14 is in fluid communication with an adapter 26. The adapter 26 is configured to permit movement of the fluid from the pumping chamber 14 to a tissue T. For example, in some embodiments, the pumping chamber 14 defines an aperture (not shown) configured to be in fluidic communication with a lumen (not shown) of the adapter 26. The adapter 26 is configured to be coupled to the tissue T. The adapter 26 can be coupled to the tissue T in any suitable manner. For example, in some embodiments, the adapter 26 is configured to be sutured to the tissue T. In another example, the adapter 26 is couplable to the tissue T via an intervening structure, such as silastic or other tubing. In some embodiments, at least a portion of the adapter 26, or the intervening structure, is configured to be inserted into the tissue T. For example, in some embodiments, the lumen of the adapter 26 (or a lumen of the intervening structure) is configured to be fluidically coupled to a vessel of the tissue T.

In some embodiments, the adapter 26 is configured to provide additional support (relieving pressure from the support surface below) to the tissue T when the tissue T is coupled to the adapter. For example, in some embodiments, the adapter 26 includes a retention mechanism (not shown) configured to be disposed about at least a portion of the tissue T and to help retain the tissue T with respect to the adapter and therefore the container. The retention mechanism can be, for example, a net, a cage, a sling, or the like. In some embodiments, the self-purging preservation apparatus 10 includes a support surface configured to support the tissue T when the tissue T is coupled to the adapter 26 or otherwise received in the preservation apparatus 10.

The adapter 26 may be of a variety of structures suitable to suspend the tissue T in the preservation solution while minimizing the potential for mechanical damage, e.g., bruising or abrasion. In some embodiments, the adapter 26 is configured to be sutured to the tissue T. In another example, the adapter 26 is coupleable to the tissue T via an intervening structure, such as silastic or other tubing. In some embodiments, at least a portion of the adapter 26, or the intervening structure, is configured to be inserted into the tissue T. In some embodiments, the adapter 26 is configured to support the tissue T when the tissue T is coupled to the adapter. For example, in some embodiments, the adapter 26 includes a retention mechanism configured to be disposed about at least a portion of the tissue T and to help retain the tissue T with respect to the adapter. The retention mechanism can be, for example, a net, a cage, a sling, or the like.

In some embodiments, a self-purging preservation apparatus may additionally include a support surface configured to support the tissue T from below wither alone or in conjunction with the adapter 26 when the tissue T is coupled to the adapter 26 or otherwise suspended in the self-purging preservation apparatus. The support mechanism may be part of an insert which fits within the self-purging preservation apparatus. The support surface may include connectors which may be flexible or hinged to allow the support surface to move in response to mechanical shock, thereby reducing the possibility of damage to tissue T. In other embodiments, the support surface may be coupled to the lid assembly so that it is easily immersed in and retracted from the preservation fluid held in the tissue chamber.

A tissue chamber 30 is configured to receive the tissue T and a fluid. In some embodiments, the self-purging preservation apparatus 10 includes a fill port 34 that is extended through the self-purging preservation apparatus 10 (e.g., through the pumping chamber 14) to the tissue chamber 30.

The port 34 is configured to permit fluid (e.g., perfusate) to be introduced to the tissue chamber 30. In this manner, fluid can be introduced into the tissue chamber 30 as desired by an operator of the self-purging preservation apparatus. For example, in some embodiments, a desired amount of perfusate is introduced into the tissue chamber 30 via the port 34, such as before disposing the tissue T in the tissue chamber 30 and/or while the tissue T is received in the tissue chamber. In some embodiments, the fill port 34 is a unidirectional port, and thus is configured to prevent the flow of fluid from the tissue chamber 30 to an area external to the tissue chamber through the port. In some embodiments, the fill port 34 includes a luer lock. The tissue chamber 30 may be of any suitable volume necessary for receiving the tissue T and a requisite amount of fluid for maintaining viability of the tissue T. In one embodiment, for example, the volume of the tissue chamber 30 is approximately 2 liters.

The tissue chamber 30 is formed by a canister 32 and a bottom portion 19 of the pumping chamber 14. In a similar manner as described above with respect to the membrane 20, an upper portion of the tissue chamber (defined by the bottom portion 19 of the pumping chamber 14) can be inclined from the first side 22 towards the second side 24 of the self-purging preservation apparatus. In this manner, as described in more detail below, a rising fluid in the tissue chamber 30 will be directed by the inclined upper portion of the tissue chamber towards a valve 36 disposed at a highest portion of the tissue chamber. The valve 36 is configured to permit a fluid to flow from the tissue chamber 30 to the pumping chamber 14. The valve 36 is configured to prevent flow of a fluid from the pumping chamber 14 to the tissue chamber. The valve 36 can be any suitable valve for permitting unidirectional flow of the fluid, including, for example, a ball check valve.

The combination of fill port 34, valve 36, and vent port 38 allow the apparatus to be quickly and reliably filled with preservation fluid during an organ harvest or some other tissue storage procedure. Once the tissue T has been loaded, i.e., with a coupler, sling, or basket as described elsewhere, the pumping chamber 14 can be affixed to the tissue chamber 30, providing an airtight seal. A tube to a reservoir of perfusion fluid can be connected to the fill port 34 allowing the tissue chamber to be filled directly from the outside. Because of the incline of the bottom portion 19 of the pumping chamber 14, any trapped fluids that are less dense than the preservation fluid (e.g., air) will travel along the bottom portion 19 and move to the pumping chamber 14 via valve 36, that can be a one-way check valve. With the addition of more preservation fluid from the fill port 34, the perfusion fluid will also move from the tissue chamber 30 to the pumping chamber 14, driving any less dense fluid to higher points in the pumping chamber 14. When the pumping chamber 14 is finally filled with preservation fluid, all of the rising fluids will be driven out of the apparatus via vent port 38. Thus, a user can simply fill the apparatus via fill port 34 and know that the apparatus is filled with preservation fluid and that all rising fluids (i.e., air) has been driven out of the apparatus when preservation fluid first appears at vent port 38. Additionally, this design conserves preservation fluid ($400/L) when compared to competing designs that immerse an organ in an over-filled preservation fluid, attempting to drive air out of the system as the lid is placed on the device.

The canister 32 can be constructed of any durable materials that are suitable for use with a medical device. For example, it can be constructed of stainless steel. In other embodiments, because it is beneficial to be able to view the contents directly, the lid 6 and storage vessel may be constructed of medical acrylic (e.g., PMMA) or another clear medical polymer. In some embodiments, the canister 32 is constructed of a material that permits an operator of the self-purging preservation apparatus 10 to view at least one of the tissue T or the perfusate received in the tissue chamber 30. For example, in some embodiments, the canister 32 is substantially transparent. In another example, in some embodiments, the canister 32 is substantially translucent. The tissue chamber 30 can be of any suitable shape and/or size. For example, in some embodiments, the tissue chamber 30 can have a perimeter that is substantially oblong, oval, round, square, rectangular, cylindrical, or another suitable shape. Additionally, the self-purging preservation apparatus should be constructed of materials that conduct heat so that the sample within the container is adequately cooled by the cooling media (see discussion below).

It is additionally beneficial for the storage vessel 2, lid without a pumping chamber 6, and adapter to be sterilizable, i.e., made of a material that can be sterilized by steam (autoclave) or with UV irradiation, or another form of sterilization. Sterilization will prevent tissues from becoming infected with viruses, bacteria, etc., during transport. In a typical embodiment the self-purging preservation apparatus will be delivered in a sterile condition and sealed in sterile packaging. In some embodiments, the self-purging preservation apparatus will be sterilized after use prior to reuse, for example at a hospital. In other embodiments, the self-purging preservation apparatus will be disposable.

In use, the tissue T is coupled to the adapter 26. The pumping chamber 14 is coupled to the canister 32 such that the tissue T is received in the tissue chamber 30. In some embodiments, the pumping chamber 14 and the canister 32 are coupled such that the tissue chamber 30 is hermetically sealed. A desired amount of perfusate is introduced into the tissue chamber 30 via the port 34. The tissue chamber 30 can be filled with the perfusate such that the perfusate volume rises to the highest portion of the tissue chamber. The tissue chamber 30 can be filled with an additional amount of perfusate such that the perfusate flows from the tissue chamber 30 through the valve 36 into the second portion 18 of the pumping chamber 14. The tissue chamber 30 can continue to be filled with additional perfusate until all atmospheric gas that initially filled the second portion 18 of the pumping chamber 14 rises along the inclined membrane 20 and escapes through the port 38. Because the gas will be expelled from the pumping chamber 14 via the port 38 before any excess perfusate is expelled (due to gas being lighter, and thus more easily expelled, than liquid), an operator of the self-purging preservation apparatus 10 can determine that substantially all excess gas has been expelled from the pumping chamber when excess perfusate is released via the port. As such, the self-purging preservation apparatus 10 can be characterized as self-purging. When perfusate begins to flow out of the port 38, the self-purging preservation apparatus 10 is in a “purged” state (i.e., all atmospheric gas initially within the tissue chamber 30 and the second portion 18 of the pumping chamber 14 has been replaced by perfusate). When the purged state is reached, the operator can close both ports 34 and 38, preparing the self-purging preservation apparatus 10 for operation.

Oxygen (or another suitable fluid, e.g., dry air) is introduced into the first portion 16 of the pumping chamber 14 via the valve 12. A positive pressure generated by the introduction of oxygen into the pumping chamber 14 causes the oxygen to be diffused through the semi-permeable membrane 20 into the second portion 18 of the pumping chamber. Because oxygen is a gas, the oxygen expands to substantially fill the first portion 16 of the pumping chamber 14. As such, substantially the entire surface area of the membrane 20 between the first portion 16 and the second portion 18 of the pumping chamber 14 is used to diffuse the oxygen. The oxygen is diffused through the membrane 20 into the perfusate received in the second portion 18 of the pumping chamber 14, thereby oxygenating the perfusate.

In the presence of the positive pressure, the oxygenated perfusate is moved from the second portion 18 of the pumping chamber 14 into the tissue T via the adapter 26. For example, the positive pressure can cause the perfusate to move from the pumping chamber 14 through the lumen of the adapter 26 into the vessel of the tissue T. The positive pressure is also configured to help move the perfusate through the tissue T such that the tissue T is perfused with oxygenated perfusate.

After the perfusate is perfused through the tissue T, the perfusate is received in the tissue chamber 30. In this manner, the perfusate that has been perfused through the tissue T is combined with perfusate previously disposed in the tissue chamber 30. In some embodiments, the volume of perfusate received from the tissue T following perfusion combined with the volume of perfusate previously disposed in the tissue chamber 30 exceeds a volume (e.g., a maximum fluid capacity) of the tissue chamber 30. A portion of the tissue chamber 30 is flexible and expands to accept this excess volume. The valve 12 can then allow oxygen to vent from the first portion 16 of the pumping chamber 14, thus, reducing the pressure in the pumping chamber 14. As the pressure in the pumping chamber 14 drops, the flexible portion of the tissue chamber 30 relaxes, and the excess perfusate is moved through the valve 36 into the pumping chamber 14. The cycle of oxygenating perfusate and perfusing the tissue T with the oxygenated perfusate can be repeated as desired.

A variety of preservation solutions can be used. This includes approved preservation solutions, such as Histidine-Tryptophan-Ketoglutarate (HTK) (e.g., HTK Custodial™) and Celsior™ solutions for the preservation of hearts and cardiac tissues, and University of Wisconsin Solution (Viaspan™) and MPS-1 for the preservation of kidney and kidney tissues. Other preservation solutions, including non-approved solutions, and off-label applications of approved solutions can be used with the devices herein. A detailed listing of the properties of various preservation solutions, including Collins, EuroCollins, phosphate buffered sucrose (PBS), University of Wisconsin (UW) (e.g., Belzer Machine Preservation Solution (MPS)), histidine-tryptophan-ketoglutarate (HTK), hypertonic citrate, hydroxyethyl starch, and Celsior™, can be found at FIGS. 5 and 6. Additional details of these solutions can be found at t'Hart et al. "New Solutions in Organ Preservation," *Transplantation Reviews* 2006, vol. 16, pp. 131-141 (2006), which is incorporated by reference in its entirety.

Temperature sensors may be any temperature reading device that can be sterilized and maintained in cold environment, i.e., the environment within the container during transport of tissue. The temperature sensor may be a thermocouple, thermistor, infrared thermometer, or liquid crystal thermometer. A temperature display may be coupled to the temperature sensor using any suitable method, for example a wire, cable, connector, or wirelessly using available wireless protocols.

In addition to the temperature sensor, systems herein may include one or more temperature displays. A temperature display can be any display suitable for displaying a temperature measured by the temperature sensor, or otherwise providing information about the temperature within the static self-purging preservation apparatus. For example, the temperature display can be a light emitting diode (LED) display or liquid crystal display (LCD) showing digits corresponding to a measured temperature. The display may alternatively comprise one or more indicator lights, for example an LED which turns on or off or flashes to indicated whether the temperature measured by the temperature sensor is within an acceptable range, e.g., 2-10° C., e.g., 4-6° C., e.g., about 4° C. The temperature sensor may also be connected to a processor (not shown) which will compare the measured temperature to a threshold or range and create an alert signal when the temperature exceeds the threshold or range. The alert may comprise an audible tone, or may signal to a networked device, e.g., a computer, cell phone, or pager that the temperature within the container exceeds the desired threshold or range.

The container may comprise an insulating material that is effective in maintaining the temperature inside the insulated transport container. A suitable insulating material may be any of a number of rigid polymer foams with high R values, such as polystyrene foams (e.g. STYROFOAM™), polyurethane foams, polyvinyl chloride foams, poly(acrylonitrile)(butadiene)(styrene) foams, or polyisocyanurate foams. Other materials, such as spun fiberglass, cellulose, or vermiculite could also be used. Typically, the insulating vessel will be constructed to provide a close fit for the desired contents (e.g., cooling material/systems, support surface, and organ or other biological sample), thereby affording additional mechanical protection to the tissues contained therein. In some embodiments, the insulated container may be constructed of a closed-cell foam that will prevent absorption of liquids, for example water, body fluids, preservation fluid, saline, etc. In some embodiments, the insulated transport container may include a water-resistant lining (not shown) to facilitate cleaning the insulated transport container after use. In some embodiments, the lining will be removable and disposable. The insulated container may have a hard shell on the exterior to protect the insulating material from damage or puncture. The hard shell may be formed of metal (e.g. aluminum or steel) or of a durable rigid plastic (e.g. PVC or ABS). The hard shell may have antibacterial properties through the use of antibacterial coatings or by incorporation of metal that have innate antibacterial properties (e.g. silver or copper).

The container may have a lid connected thereto with a hinge, hasp, clasp, or other suitable connector. The container lid may also close with a press-fit. The insulated transport container may include an insulating seal to make to make an air- or water-tight coupling between the container and lid. However, the insulated lid need not be sealed to the container for the insulated transport container to maintain a suitable temperature during transport. In some embodiments, the container and lid will be coupled with a combination lock or a tamper-evident device. The container may additionally comprise a handle or a hand-hold or facilitate moving the insulated transport container when loaded. In some embodiments, the container may additionally have external wheels (e.g. castor wheels or in-line skate type wheels). The insulated container may also have a rollaboard-type retractable handle to facilitate moving the system between modes of transport or around a hospital or other medical facility.

The system may use any of a number of active or passive cooling media to maintain the temperature inside the insulated transport container during transport. The cooling media may comprise eutectic cooling blocks, which have been engineered to have a stable temperature between 2-10° C., for example. The cooling media may be arranged in recesses in the interior of the insulated container. The recesses may be a slot or pockets/shelves formed above and under trays or support surfaces as shown in FIG. 2. In certain embodiments, recesses may be a press-fit, or the cooling media may be coupled to the walls, floor, or lid of the container using a snap, screw, hook and loop, or another suitable connecter. Eutectic cooling media suitable for use herein is available from TCP Reliable Inc. Edison, NJ 08837, as well as other suppliers. Other media, such as containerized water, containerized water-alcohol mixtures, or containerized water-glycol mixtures may also be used. The container need not be rigid, for example the cooling media may be contained in a bag which is placed in the recess. Using the cooling media, e.g. eutectic cooling blocks, the systems and methods herein are capable of maintaining the temperature of the sample in the range of 2-10° C. for at least 60 minutes, e.g., for greater than 4 hours, for greater than 8 hours, for greater than 12 hours, or for greater than 16 hours.

In various embodiments, cooling blocks may include eutectic cooling media or other phase change material (PCM) such as savENRG packs with PCM-HS01P material commercially available from RGEES, LLC or Akuratemp, LLC (Arden, NC). The PCM may have a phase change formulated between about 0° C. and about 10° C. Exemplary PCM specifications including a freezing temperature of 0° C.+/−0.5° C., a melting temperature of 1° C.+/−0.75° C., latent heat of 310 J/g+/−10 J/g, and density of 0.95 gram/ml+/−0.05 gram/ml. In some embodiments the PCM may have a latent heat of about 200 J/g to about 400 J/g. Pouch dimensions may vary depending on application specifics such as tissue to be transported and the internal dimensions of the transport container and external dimensions of the tissue storage device, chamber, or canister. PCM may be included in pouches approximately 10 inches by 6 inches having approximately 230 g of PCM therein. Pouches may be approximately 8.5 mm thick and weigh about 235 g to 247 g. In some embodiments, pouches may be approximately 6.25 inches by 7.75 inches with a thickness of less than about 8.5 mm and a weight of between about 193 g and about 201 g. Other exemplary dimensions may include about 6.25 inches by about 10 inches. Pouches may be stacked or layered, for example in groups of 3 or 4 to increase the total thickness and amount of PCM. In certain embodiments, PCM containing pouches may be joined side to side to form a band of coupled PCM pouches. Such a band may be readily manipulated to wrap around the circumference of a cylindrical storage container and may have dimensions of about 6 inches by about 26 inches consisting of approximately 8 individual pouches joined together in the band.

The container and portions of the support surface may be constructed from or covered in a sterilizable material, i.e., made of a material that can be sterilized by steam (autoclave) or with UV irradiation, or another form of sterilization. Sterilization will prevent tissues from becoming infected with viruses, bacteria, etc., during transport. In a typical embodiment the sterile canister will be delivered in a sterile condition and sealed in sterile packaging. In some embodiments, the sterile canister apparatus will be re-sterilized prior to reuse, for example at a hospital. In other embodiments, the sterile canister will be disposable.

Thus, using the system for hypothermic transport of tissues herein, it is possible to transport a biological sample (e.g. tissue, organs, or body fluids) over distances while maintaining a temperature of 2-10° C. Systems herein will enable medical professionals to keep tissues (e.g. organs) in a favorable hypothermic environment for extended periods of time, thereby allowing more time between harvest and transplant. As a result, a greater number of donor organs will be available thereby saving lives.

Although various embodiments have been described as having particular features and/or combinations of components, other embodiments are possible having any combination or sub-combination of any features and/or components from any of the embodiments described herein. The specific configurations of the various components can also be varied. For example, the size and specific shape of the various components can be different than the embodiments shown, while still providing the functions as described herein. Thus, the breadth and scope herein should not be limited by any of the above-described embodiments. The previous description of the embodiments is provided to enable any person skilled in the art to make or use aspects of the invention. While aspects of the invention have been particularly shown and described with reference to embodiments thereof, it will be understood by those skilled in the art that various changes in form and details may be made therein without departing from the spirit and scope herein.

Additional systems and methods are disclosed in the Examples below, which should not be viewed as limiting the invention in any way.

Example 1. A container for transporting a biological sample, comprising: a sample storage chamber comprising a floor and walls and configured to receive a biological sample; a removable lid operable to couple with the walls; a first cooling media positioned on or near the floor; a removable sample support surface positioned above the cooling media operable to suspend the biological sample above the first cooling media and define a first cooling media pocket between the floor and the removable sample support surface; and a removable cooling media support surface positioned above the sample support surface operable to suspend a second cooling media above the biological sample and define: a sample storage pocket between the removable sample support surface and the removable cooling media support surface and second cooling media; and a second cooling media pocket between the removable cooling media support surface and the removable lid, wherein the removable sample support surface and the removable cooling media support surface prevent direct contact and local conduction between the first cooling media, the second cooling media, and the biological sample.

Example 2. The container of example 1, wherein the first and second cooling media comprise a phase change material (PCM).

Example 3. The container of example 2, wherein the PCM has a phase change formulated between about 0° C. and about 10° C.

Example 4. The container of example 3, wherein the PCM has a melting temperature of about 1° C.+/−0.75° and a freezing temperature of about 0° C.+/−0.5°.

Example 5. The container of example 2, wherein the PCM has a latent heat of about 200 J/g to about 400 J/g.

Example 6. The container of example 5, wherein the PCM has a latent heat of about 310 J/g.

Example 7. The container of example 2, having a total mass of PCM between about 1000 g and about 3000 g.

Example 8. The container of example 7, having a total mass of PCM between about 2600 g and about 2800 g.

Example 9. The container of example 2, wherein the second cooling media consists of about 50% to about 80% of total PCM in the container and the first cooling media consists of about 20% to about 50% of the total PCM in the container.

Example 10. The container of example 9, wherein the second cooling media consists of about 70% to about 75% of total PCM in the container and the first cooling media consists of about 25% to about 30% of the total PCM in the container.

Example 11. The container of example 2, wherein the first cooling media PCM is centered below the biological sample.

Example 12. The container of example 11, wherein the second cooling media PCM is distributed evenly across the removable cooling media support surface.

Example 13. The container of example 2, wherein the PCM has a latent heat about 200 J/g and about 100 J/g for every gram of biological sample mass within the sample storage container.

Example 14. The container of example 2, wherein the PCM is contained in one or more laminated films.

Example 15. The container of example 14, wherein the one or more laminated films have a water vapor transmission rate (WVTR) of less than about 5 g/m2/day.

Example 16. The container of example 15, wherein the one or more laminated films have a WVTR of less than about 1 g/m2/day.

Example 17. The container of example 1, wherein one or more of the walls comprise one or more features extending into the sample storage chamber, and wherein one or more of the removable sample support surface and the cooling media support surface are sized and shaped to interact with the one or more features to suspend one or more of the removable sample support surface and the removable cooling media support surface above the floor.

Example 18. The container of example 1, wherein one or more of the removable sample support surface and the cooling media support surface comprises an acrylic polymer to provide rigidity.

Example 19. The container of example 1, wherein one or more of the removable sample support surface and the cooling media support surface comprises a closed cell foam to provide cushioning and thermal insulation.

Example 20. A container for transporting a biological sample, comprising: a sample storage chamber comprising a floor and walls and configured to receive a biological sample; a removable lid operable to couple with the walls; a cooling media positioned on or near the floor for maintaining a stable temperature within a sterile environment; a removable support surface positioned above the cooling media operable to support the biological sample, wherein the support surface comprises a plurality of layers configured to provide a biological sample cushion, thermal insulation, and physical separation and protection from the sample storage chamber and the cooling media.

Example 21. The container of example 20, wherein the removable support surface comprises a core layer operable to provide rigidity to support the biological sample and provide a barrier between the biological sample and the cooling media.

Example 22. The container of example 21, wherein core layer comprises a temperature probe positioned on a surface facing the biological sample.

Example 23. The container of example 22, wherein the core layer comprises a relief sized and shaped to receive and position the temperature probe relative to the biological sample.

Example 24. The container of example 21, wherein the core layer comprises an acrylic polymer.

Example 25. The container of example 21, wherein one or more of the walls comprise a feature extending into the sample storage chamber, the support surface sized and shaped to interact with the feature to suspend the support surface and the biological sample above the cooling media and floor.

Example 26. The container of example 22, wherein the removable support surface comprises a cushion layer positioned between the biological sample and the core layer and configured to contact the biological sample.

Example 27. The container of example 26, wherein the cushion layer comprises a thermal conductivity of 0.1 W/mK or less.

Example 28. The container of example 27, wherein the cushion layer comprises a closed cell foam.

Example 29. The container of example 26, wherein the cushion layer is contoured to correspond to a shape of the biological sample.

Example 30. The container of example 26, wherein the cushion layer comprises a cutout positioned above the temperature probe such that no insulative material is in place between the temperature probe and the biological sample.

Example 31. The container of example 26, wherein the cushion layer comprises a textured surface configured to interact with the biological sample or a bag containing the biological sample to increase a coefficient of friction therebetween to reduce lateral motion of the biological sample along the textured surface.

Example 32. The container of example 22, wherein the removable support surface comprises an insulating layer positioned between the cooling media and the core layer.

Example 33. The container of example 32, wherein the insulating layer comprises a thermal conductivity of 0.1 W/mK or less.

Example 34. The container of example 33, wherein the insulating layer comprises a closed cell foam.

Example 35. The container of example 32, wherein the insulating layer comprises a cutout positioned below the temperature probe sized to receive an insulator plug positioned between the temperature probe and the cooling media.

Example 36. The container of example 35, wherein the insulator plug comprises expanded polystyrene.

Example 37. The container of example 36, wherein the expanded polystyrene has a density of about 2 lb/ft3+/−10%.

Example 38. The container of example 22, wherein the temperature probe comprises a temperature sensor within a blunt jacket to protect the biological sample or a bag containing the biological sample from damage.

Example 39. The container of example 38, wherein the blunt jacket comprises stainless steel.

Example 40. The container of example 22, wherein the temperature probe comprises a thermistor.

Example 41. The container of example 32, wherein the removable support surface comprises a rigid layer positioned between the insulating layer and the cooling media.

Example 42. The container of example 41, wherein the rigid layer provides rigidity to support the biological sample and provides a barrier between the insulating layer and the cooling media.

Example 43. The container of example 42, wherein the rigid layer comprises an acrylic polymer.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope herein is thus indicated by the appended claims rather than by the foregoing description, and all changes which come within the meaning and range of equivalency of the claims are therefore intended to be embraced therein.

What is claimed is:

1. A container for transporting a biological sample, comprising:

a sample storage chamber comprising a floor and walls and configured to receive a biological sample;

a sample support surface configured to be positioned within the sample storage chamber to support the biological sample, wherein the sample support surface when positioned within the sample storage chamber defines a cooling media pocket between the floor and the sample support surface to receive a cooling media, wherein the sample support surface comprises:

an insulating layer configured to insulate the cooling media from the biological sample;

a core layer configured to provide rigidity to support the biological sample, the core layer positioned above the insulating layer, the core layer comprising a recess and an aperture;

an insulator plug positioned in the recess of the core layer; and a cushion layer positioned above the core layer, the cushion layer comprising an opening configured to expose the insulator plug; and a temperature sensor comprising:

a lead configured to be positioned through the aperture of the core layer; and a thermistor configured to be positioned within the opening of the cushion layer in contact with an upper surface of the insulator plug, such that the thermistor is above the recess of the core layer and exposed by the opening of the cushion layer, wherein the insulator plug is sized and shaped to support the thermistor such that the lead is positioned through the aperture outside of a boundary of the recess, wherein the aperture and the recess are aligned along a face of the core layer.

2. The container of claim 1, wherein the sample support surface further comprises a rigid layer positioned beneath the insulating layer.

3. The container of claim 1, further comprising the cooling media configured to be positioned within the cooling media pocket, the cooling media comprising a phase change material (PCM).

4. The container of claim 3, wherein the PCM has a phase change formulated between about 0° C. and about 10° C.

5. The container of claim 1, further comprising a cooling media support surface configured to support a second cooling media, the cooling media support surface configured to be positioned above the biological sample.

6. The container of claim 5, wherein the cooling media and the second cooling media comprise a phase change material (PCM), wherein the second cooling media comprises more PCM by volume than the cooling media.

7. The container of claim 5, wherein one or more of the walls comprise one or more ridges extending into the sample storage chamber, and wherein one or more of the sample support surface and the cooling media support surface are sized and shaped to interact with the one or more ridges to suspend one or more of the sample support surface and the cooling media support surface above the floor.

8. The container of claim 5, wherein the cooling media support surface comprises a lower surface, an upper surface, and side surfaces defining a slot configured to receive the second cooling media.

9. The container of claim 1, wherein the cushion layer comprises a textured surface configured to interact with the biological sample or a bag containing the biological sample to increase a coefficient of friction therebetween to reduce lateral motion of the biological sample along the textured surface.

10. The container of claim 1, wherein at least one of the insulating layer or the insulator plug comprise a closed cell foam.

11. The container of claim 1, wherein the insulating layer comprises an aperture configured to receive the insulator plug.

12. The container of claim 11, wherein the aperture of the insulating layer is coaxial with the recess of the core layer.

13. The container of claim 1, wherein the insulating layer comprises a slit configured to receive a lead of the temperature sensor.

14. The container of claim 2, wherein at least one of the core layer or the rigid layer comprises an acrylic polymer.

15. The container of claim 1, wherein the insulator plug comprises expanded polystyrene.

16. The container of claim 1, wherein the temperature sensor comprises a temperature sensor within a blunt jacket to protect the biological sample or a bag containing the biological sample from damage.

17. The container of claim 1, wherein the cushion layer comprises foam.

18. The container of claim 1, wherein the sample support surface is configured to be positioned entirely beneath the biological sample.

* * * * *